United States Patent
Okayama et al.

(10) Patent No.: US 6,249,767 B1
(45) Date of Patent: Jun. 19, 2001

(54) PORTABLE INFORMATION TERMINAL SURROUNDING FORMULATION OF AN OPTIMUM PLAN

(75) Inventors: Masataka Okayama, Ebina; Tohru Hoshi, Yokohama, both of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/011,991

(22) PCT Filed: Aug. 23, 1995

(86) PCT No.: PCT/JP95/01668

§ 371 Date: Aug. 20, 1998

§ 102(e) Date: Aug. 20, 1998

(87) PCT Pub. No.: WO97/08636

PCT Pub. Date: Mar. 6, 1997

(51) Int. Cl.[7] .................................................... G06F 17/60
(52) U.S. Cl. ................................ 705/5; 705/6; 701/202; 701/210
(58) Field of Search .................................. 705/1, 5, 6, 10, 705/15; 340/991, 992, 994; 701/202, 204, 206, 210

(56) References Cited

U.S. PATENT DOCUMENTS

| | | | |
|---|---|---|---|
| 4,298,793 | * 11/1981 | Melis et al. | 235/487 |
| 4,530,067 | * 7/1985 | Dorr | 705/15 |
| 5,506,774 | * 4/1996 | Nobe et al. | 701/213 |
| 5,568,390 | * 10/1996 | Hirota et al. | 701/201 |
| 5,610,821 | * 3/1997 | Gazis et al. | 455/456 |

FOREIGN PATENT DOCUMENTS

| | | | |
|---|---|---|---|
| 6245254 | * 8/1988 | (JP) | H04Q/7/04 |
| 63-286967 | * 8/1988 | (JP) | G06F/15/26 |
| 1156619 | * 6/1989 | (JP) | G01C/21/00 |
| 4213761 | * 8/1992 | (JP) | G06F/15/26 |
| 620194 | * 1/1994 | (JP) | G08G/1/0968 |

OTHER PUBLICATIONS

Schwartz Jeffrey, Presto? Start–Up Preps Magic Cap, Communication sWeek, Newsletter, Trade, p57, Jan. 1994.*
McMullen, Melanie, Glen Brownlee; vice president and general manager, Motorola Wireless Data Group, LAN Magazine, v9, n7, p34(3), Jul. 1994.*
Carroll, Cathy, "Get ready for life in the fast lane", Travel Weekly, v54, n48, p41(2), Jan. 1994.*

* cited by examiner

*Primary Examiner*—Eric W. Stamber
*Assistant Examiner*—Hani M. Kazimi
(74) *Attorney, Agent, or Firm*—Antonelli, Terry, Stout & Kraus, LLP.

(57) ABSTRACT

A portable information terminal including a self-positioning measuring device is provided to make reservations and obtain status information of available services from a plurality of reservation centers and a plurality of status information providers, via a communication network. Such a portable information terminal may comprise a reserving unit for accessing to a reservation center, and reservation storage for storing a reservation content of a reservation; a status information collecting and judging unit for collecting status information relating to execution of the reservation content from the status information providers via the communications network and deciding, based on collected information and position information obtained by the self-positioning device, whether to move to a location for execution of the reservation content, deciding whether the reservation content is to be changed; an alternative reservation generating unit for collecting, in the case where the status information collecting and judging unit judges that the reservation content is to be changed, information relating to an alternative reservation to show the alternative reservation; and a reservation change execution unit for canceling the current reservation and storing the alternative reservation into the reservation storage.

15 Claims, 20 Drawing Sheets

FIG. 7

| | |
|---|---|
| ID | 410 |
| RESERVATION OBJECT CATEGORY | 420 |
| RESERVATION NUMBER | 430 |
| RESERVATION DATE | 440 |
| POINTER TO DATA BY CATEGORY | 450 |
| POINTER TO RESERVATION MANAGEMENT DATA STRUCTURE OF PRECEDING RESERVATION | 460 |
| POINTER TO RESERVATION MANAGEMENT DATA STRUCTURE OF SUCCEEDING RESERVATION | 470 |

| ID 510 | POINTER TO LEADING RESERVATION MANAGEMENT DATA STRUCTURE 520 | RESERVATION TERM 530 |
|---|---|---|
| 1 | POINTER 1 | 3/3~3/3 |
| 2 | POINTER 2 | 4/10~4/11 |
| ⋮ | ⋮ | |
| N | POINTER N | 6/9~6/9 |

($N \geq 1$)

| RESERVATION ID 610 | NUMBER FOR ACCESS TO STATUS INFORMATION IP 620 | AGENT EXISTENCE LOCATION 630 |
|---|---|---|
| 1 | ACCESS NUMBER 1 | 1 |
| | NULL | 2 |
| | ACCESS NUMBER 2 | 1 |
| ... | ... | ... |
| | NULL | 2 |
| N | NUMBER FOR ACCESS TO ANOTHER TERMINAL | 2 |

(N≧1)

600

1···EXECUTED IN IP
2···EXECUTED IN ITS OWN TERMINAL

FIG. 10

| AGENT NUMBER 710 | FILTERING NUMBER 720 | FEEDBACK CONDITION 730 | EXISTENCE TERM 740 |

| AGENT NUMBER (810) | RESERVATION ID (820) | NUMBER FOR ACCESS TO STATUS INFORMATION IP (830) | AGENT EXISTENCE LOCATION (840) |
|---|---|---|---|
| 1 | | ACCESS NUMBER 1 | 1 |
| 2 | | NULL | 2 |
| ... | | | |
| N | | ACCESS NUMBER 2 | 2 |

(N≧1)

800

FIG. 13
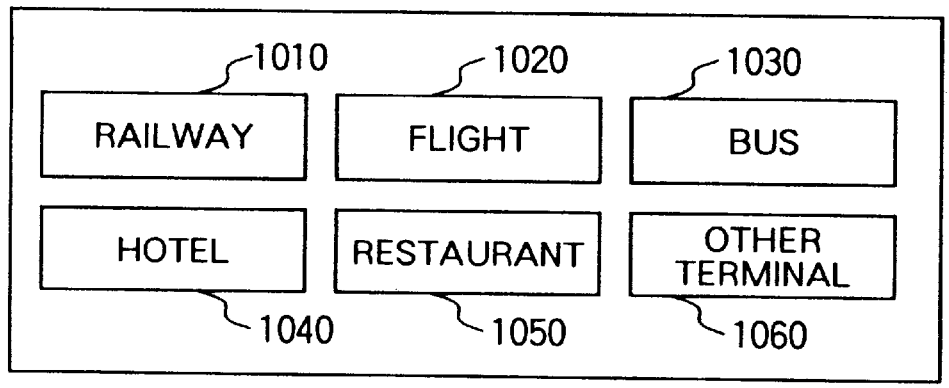
FIG. 14
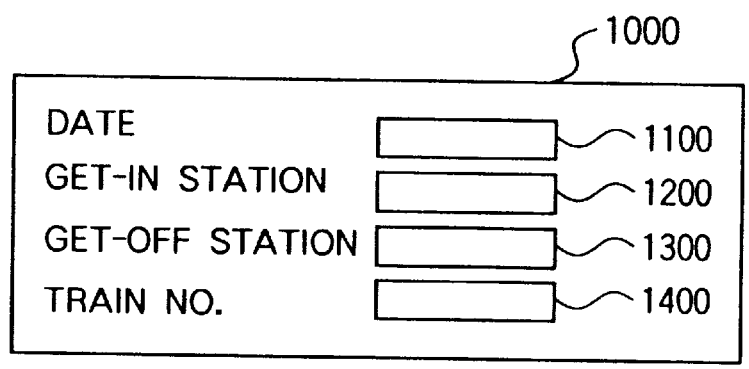
(a)
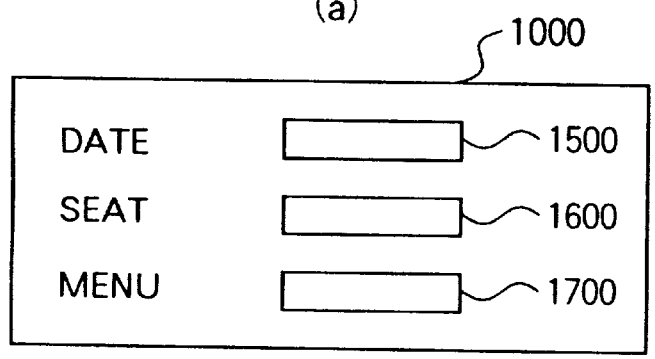
(b)

PORTABLE INFORMATION TERMINAL SURROUNDING FORMULATION OF AN OPTIMUM PLAN

CROSS-REFERENCE TO RELATED APPLICATION

This application claims priority under 35 U.S.C. §119 from PCT/JP95/01668, filed Aug. 23, 1995.

TECHNICAL FIELD

The present invention relates to a portable information terminal in which the formulation of the optimum plan to be performed by a user is supported coping with the change of various statuses surrounding a user.

BACKGROUND ART

In recent years, various mobile communication systems have been contrived and developed and a sphere of user's action has shown a corresponding tendency to extend. For example, the Future Public Land Mobile Telecommunication Systems (hereinafter referred to as FPLMTS) proceeding to the standardization thereof with a target of the start of operation about in the year 2000 provide a wide service area with the possibility of a roaming on a world-wide scale. The FPLMTS has been disclosed by Haruhiko Yasuda, "Mobile Communications of ISDN Age", pp. 211–223 published by the OHMsha Ltd.

On the other hand, the progress of hardware and technology such as the elongation in lifetime of battery has made portable information terminals small in size and high in function and has made it possible for a user to carry the portable information terminal with him or her always.

Various services have been contrived under such backgrounds. For example, a reservation system includes a system, disclosed by JP-A-4-213761, in which a reservation is made from a terminal provided in a vehicle. The disclosed system is a system in which an instant of time of arrival at a service shop is determined from jam information or the like so that a reservation onto the determined instant of time is made.

However, with the extension of a sphere of user's action, statuses surrounding the user become various. In addition, these statuses change with the lapse of time. In the above-mentioned prior art, the instant of time of arrival at the service shop is determined from jam information or the like so that the reservation onto the optimum instant of time is made. But, this cannot cope with a change in jam status after reservation. In the case where the jam status changes, the user must make the reservation again in dependence upon a judgement based on the user's feeling.

An object of the present invention is to provide a status adapted planning support system in which a reservation made in advance and information of a status forming an obstacle to the execution of the reserved matter are collected by communication means and the collected information and the reserved matter are compared with each other so that an impediment in executing the reserved matter is extracted to make the presentation or vicarious execution of a new portable information terminal (or reservation), and a device such as a portable information terminal which is used in such a system.

Other objects of the present invention are to provide an information service in which information of a status as an obstacle to the execution of a matter reserved by a user in advance is provided and to provide a status adapted planning support method in which information from a status information provider to present that information service is acquired on occasion by use of communication means and a new plan is formed and presented on the basis of the acquired information.

A further object of the present invention is to provide a method in which the judgement of whether or not the execution is possible is made by estimating the user's action at the present time on the basis of status information acquired by use of communication means and the position of a user acquired by use of a self-position measuring system, and a device such as a portable information terminal which uses such a method.

DISCLOSURE OF INVENTION

To achieve the above object, the present invention comprises a plurality of status information providing means connected to a communication network and a portable information terminal connected to the communication network by use of radio, the portable information terminal being provided with plan storing means for storing the content of a plan, status information collecting and judging means for collecting status information related to a change of the plan content from the status information providing means through the communication network and comparing the collected information and the plan content to judge whether or not the plan content is to be changed, alternative plan generating means for collecting, in the case where the status information collecting and judging means judges said plan content as being to be changed, information related to an alternative plan to formulate the alternative plan, and plan change executing means for cancelling the present plan and storing the alternative plan into the plan storing means.

Also, for example, for a reservation attendant upon a plan, the present invention comprises a reservation center and status information providing means which are connected to a communication network and a portable information terminal which is connected to the communication network by use of radio, in which the portable information terminal includes reserving means for making access to the reservation center to make a reservation, status information monitoring means for collecting, from the status information providing means through the communication network, information of a status which causes the falling of the execution of the reserved matter into a difficult situation, and making in accordance with a change of the collected status information the judgement of whether or not the execution of the reserved matter becomes difficult, and status change coping means for making the presentation or vicarious execution of an action to be taken next by a user by means of a display device when the status information monitoring means judges the execution of the reserved matter as being difficult.

Further, the portable information terminal is further provided with storing means, and the reserving means is provided for displaying information representative of the objects of reservation on the display device and for making access to the reservation center in regard to an object of reservation selected by the user to make a reservation to the reservation center and holding the reserved matter into the storing means.

Also, the status information monitoring means may be provided with means for selecting status information provided by the status information providing means to extract necessary information, and means for making in accordance with the extracted information the judgement of whether or not the execution of the reserved matter held in the storing means falls into a difficult situation.

Further, the status information monitoring means may be provided with means for receiving information from another portable information terminal in said mobile communication system through said radio communication device, and means for making on the basis of the received information the judgement of whether or not the execution of the reserved matter held in said storing means falls into a difficult situation.

Further, the portable information terminal may be further provided with a self-position measuring device, and the status information monitoring means is provided with means for determining the shortest movement time to a place for execution of the reserved matter held in the storing means on the basis of positional information acquired by the self-position measuring device, and means for making in accordance with the result of determination the judgement of whether or not the execution of the reserved matter held in the storing means falls into a difficult situation.

Further, the status change coping means may be provided with means for informing the user that the execution of the reserved matter held in the storing means is falling into a difficult situation.

Further, the status change coping means may be provided with means for making access to the reservation center to cancel the reservation held in the storing means.

Further, the status change coping means may be provided with means for determining the shortest movement time to a place to execution of the reserved matter held in the storing means, means for making a re-reservation in compliance with an estimated instant of time of arrival at a place for execution of the reserved matter held in the storing means, and means for holding the re-reserved matter into the storing means.

Further, the status change coping means may be provided with means for presenting alternative means to the user to make a reservation for means selected by the user, and means for cancelling the reservation held in the storing means and holding the reserved matter into the storing means.

Further, the status change coping means may be provided with means for changing, when the reservation held in the storing means is changed, that reservation held in the storing means which has a relationship with the change.

Also, the reservation center may be provided with reservation managing means for accepting a reservation from the portable information terminal to store the result of reservation as reservation information into an auxiliary storage, and reservation information presenting means for presenting the reservation information to the portable information terminal.

Also, the status information providing means may include status information collecting means for holding the latest status information into an auxiliary storage, and reservation information presenting means for presenting status information to the portable information terminal.

In a status adapted planning support system of the present invention, for example, in the case where a user formulates a certain plan and if the plan have a need of a reservation, the user gives that instruction to a portable information terminal carried with him or her. Then, reserving means in the portable information terminal is activated so that a group of icons representing the objects of reservation are displayed on the above-mentioned display device of the portable information terminal.

Next, the user selects an icon for a desired reservation from among the group of icons. Thereafter, the reserving means makes access to a reservation center corresponding to the desired reservation and connected to a communication network composed of the combination of a wire communication network and a radio communication network to acquire a vacancy status of reservation therefrom so that it is displayed on the display device.

Next, the user inputs the detailed information of the reservation from a display screen for input of detailed information of reserving with reference to the vacancy status. The reserving means requests a reservation to the reservation center on there basis of the detailed information. The reservation center judges whether or not the requested reservation is possible. The judgement is made on the basis of the content of a reservation information data base managed by the reservation center. When the reservation is completed, the reservation center stores the details of the reservation into storing means of the portable information terminal and activates status information monitoring means as an agent.

The status information monitoring means as the agent successively collects status information related to the execution of the stored reservation from a status information IP which is connected to the above-mentioned communication network for providing the status information, and so forth. The collected status information and the reservation stored in the storing means are compared with each other to judge whether or not there is an impediment in executing the reservation. In the case where there is an impediment, the status information monitoring means activates status change coping means.

The status change coping means analyzes the contents of impediment to present the impediment and determines the shortest time for arrival at a place for execution of the reservation so that the cancellation of the held reservation from the storing means and the re-reservation based on the determined shortest arrival time are made to the reservation center. Further, the details of the re-reservation are stored into the storing means. Instead of making the re-reservation, the status change coping means may present alternative means to the user so that the cancellation of the held reservation from the storing means and a reservation required for the alternative means are made to the reservation center. In this case too, the details of the required reservation are stored into the storing means.

Thereafter, the status change coping means judges whether or not the above-mentioned change of reservation causes the need of a change for another reservation. In the case where the need of a change is caused, the other reservation is similarly changed.

BRIEF DESCRIPTION OF DRAWINGS

FIG. 7 is a diagram showing the construction of data in a reservation management data structure, FIG. 8 is a diagram showing the construction of data in a reservation management table, FIG. 9 is a diagram showing the construction of data in a status information coping table, FIG. 10 is a diagram showing the construction of data in an agent parameter, FIG. 11 is a diagram showing the construction of data in an execution agent management table, FIG. 13 is a diagram for explaining displayed example icons representative of the objects of reservation on a display screen in the present embodiment, FIG. 14 is a diagram for explaining displayed examples on a display screen for input of detailed data of reservation in the present embodiment.

BEST MODE FOR CARRYING OUT THE INVENTION

Embodiments of the present invention will now be described in reference to the drawings.

Figure 1:
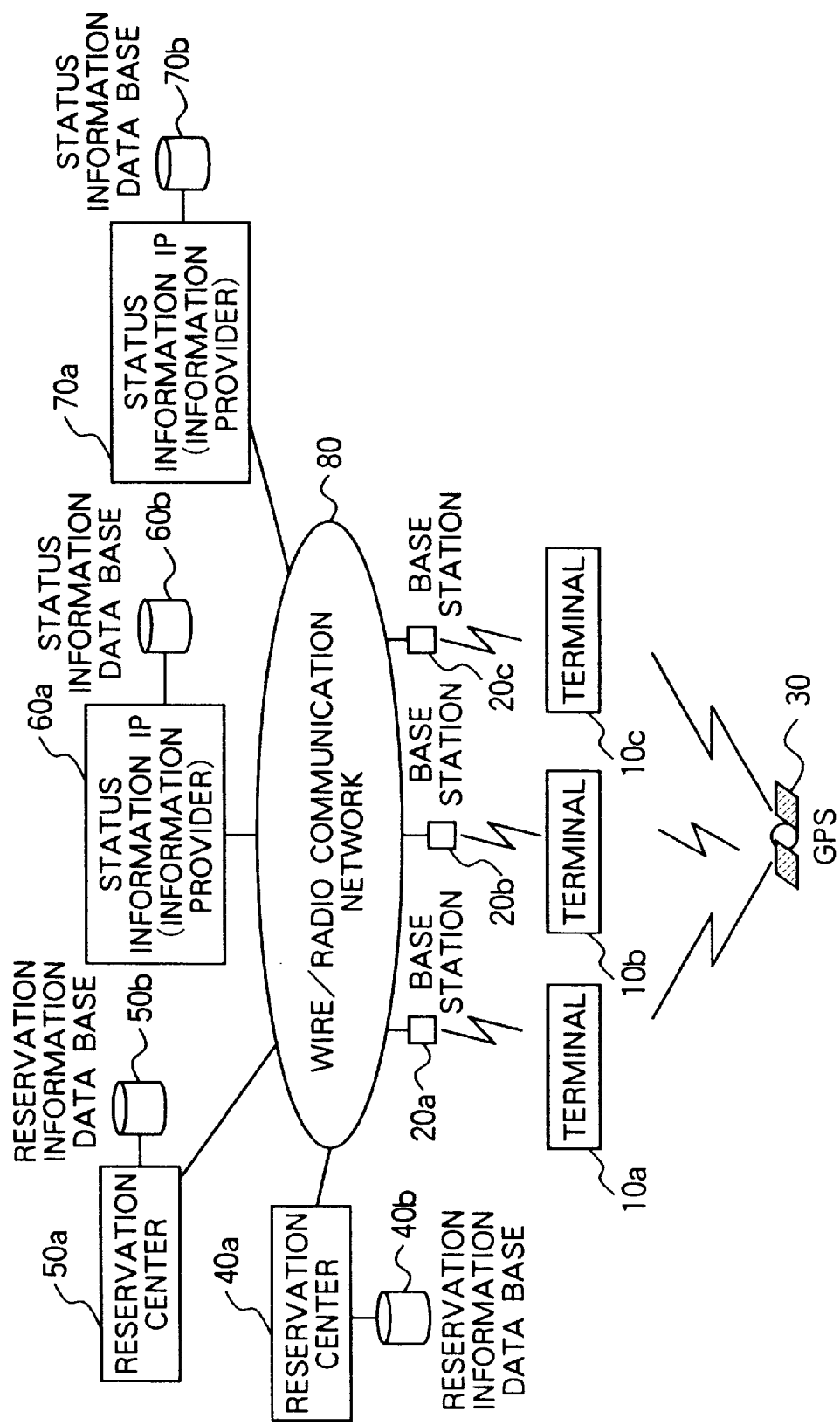
FIG. 1 is a systematic diagram of a status adapted action support system according to an embodiment of the present invention.

FIG. 1 is a block diagram of a system to which the present invention is applicable. In the figure, reference numerals 10a, 10b and 10c denote portable information terminals, numerals 20a, 20b and 20c base stations in a radio communication network, numeral 30 an artificial satellite for GPS (Global Positioning System), numerals 40a and 50a reservation centers, numerals 40b and 50b reservation information data bases, numerals 60a and 70a status information IP's (Information Providers), numerals 60b and 70b status information data bases, and numeral 80a communication network using wire and radio.

The portable information terminal 10a, 10b or 10c is always carried with a user during movement and communicates with another portable information terminal, the reservation center 40a or 50a and the status information IP 60a or 70a through the base station 20a, 20b or 20c and the wire/radio communication network 80. For example, in the case where information is to be transmitted from the portable information terminal 10a to the portable information terminal 10b, the information is sent to the base station 20a near a place at which the portable information terminal 10a is positioned. Further, the information is then transmitted through the wire/radio communication network 80 to the portable information terminal 10b from the base station 20b near a place at which the portable information terminal 10b is positioned.

The base stations 20a, 20b and 20c are installed at intervals of about one hundred meters to several-tens kilometers and are connected to the wire/radio communication network 80. Also, the base station performs the transmission and reception of information by use of radio for portable information terminals which exist within the range of electric waves. The construction of the base stations 20a, 20b and 20c is determined by the specification of the wire/radio communication network 80. Since the wire/radio communication network 80 can be realized with the application of already developed communication techniques expected to be used in FPLMTS and so forth, the detailed description thereof will be omitted.

The portable information terminal 10a, 10b or 10c determines the present position thereof through the reception of electric waves from three or four among twenty four artificial satellites 30 for global positioning system (hereinafter referred to as GPS) which move round the earth. Since the GPS has been disclosed by, for example, Haruhiko Yasuda, "Mobile Communications of ISDN Age", pp. 147–148 published by the OHMsha Ltd and the construction thereof or the like has already been known, the detailed description thereof will be omitted.

The reservation center 40a or 50a is connected to the wire/radio communication network 80 for performing the management of various reservation statuses and the acceptance of reservations from the portable information terminals 10a to 10c. Also, the reservation center 40a or 50a has the reservation information data base 40b or 50b for holding reservation statuses.

The status information IP 60a or 70a is connected to the wire/radio communication network 80 for presenting various situation information such as jam information of roads and meteorological information to the portable information terminals. Also, the status information IP 60a or 70a has the status information data base 60b or 70b for holding the present statuses.

The wire/radio communication network 80 is formed by the combination of a public wire communication network represented by a telephone line, ISDN line or the like and a base station or a radio communication network using a low-orbit rounding satellite (not shown) or the like. For example, FPLMTS (Future Public Land Mobile Communication Systems) with the expectation of the start of operation thereof in the 21st century corresponds to such combination.

Figure 2:
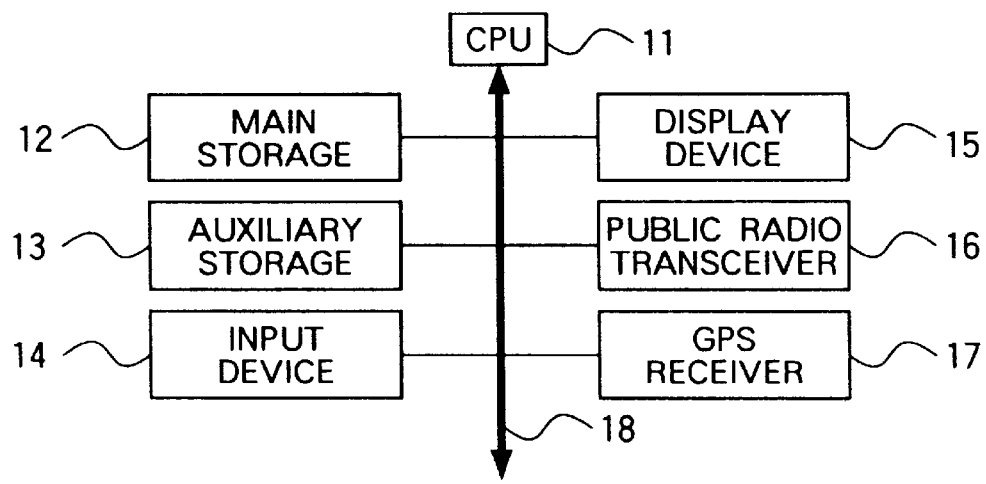
FIG. 2 is a schematic hardware block diagram of a portable information terminal in the present embodiment.

FIG. 2 is a hardware block diagram of the portable information terminal in the present embodiment.

In FIG. 2, reference numeral 11 denotes a CPU, numeral 12 a main storage, numeral 13 an auxiliary storage, numeral 14 an input device, numeral 15 a display device, numeral 16 a public radio transceiver, numeral 17 a GPS receiver, and numeral 18 a bus.

The main storage 12 is particularly realized by a ROM, a RAM or the like. The auxiliary storage 13 is particularly realized by a floppy disk, a hard disk, an IC card or the like. The input device 14 is particularly realized by a keyboard or a pointing device such as a pen device. The display device 15 is particularly realized by a liquid crystal display, a controller for the display and so forth. The public radio transceiver 16 is formed by a transmitter and a receiver for public radio and the contents thereof are determined by the specification of the wire/radio communication network 80. In the present embodiment, the public radio transceiver 16 is used for the acquisition (or reception) of status information from the status information IP, the transfer (or transmission and reception) of an agent between the status information IP and the portable information terminal, the communication with (or the transmission and reception for) another portable information terminal and the reception of broadcasted status information, as will be mentioned later on. The public radio transceiver 16 performs the direct transfer of information for the base stations 20a, 20b and 20c or the above-mentioned low-orbit rounding satellite.

Herein, the agent is a program stored in the main storage 12 or the auxiliary storage 13. As mentioned above, the agent performs the operation of collecting information of a status which causes the falling of the execution of a reserved matter into a difficult situation, the collection being made from the status information IP through the communication network 80, and making on the basis of a change of the collected status information the judgement of whether or not the execution of the reserved matter becomes difficult. The transfer of the agent from the portable information terminal 10a, 10b or 10c to the status information IP 60a or 70a means that the copy of a program stored in the main storage 12 or the auxiliary storage 13 is sent through the wire/radio communication network 80 to a main storage or auxiliary storage of the status information IP which will be mentioned later on. The details of the contents of a process performed by this program will be mentioned later on.

In the present embodiment, a known technique such as FPLMTS is applicable to the wire/radio communication network 80. Therefore, the detailed description of the public radio transceiver 16 will be omitted.

Since the GPS receiver 17 provided for receiving electric waves from the artificial satellite 30 for GPS can be realized through the application of the known technique, as mentioned above, the detailed description thereof will be omitted. These constituent elements are connected to the CPU 11 through the bus 18.

Figure 3:
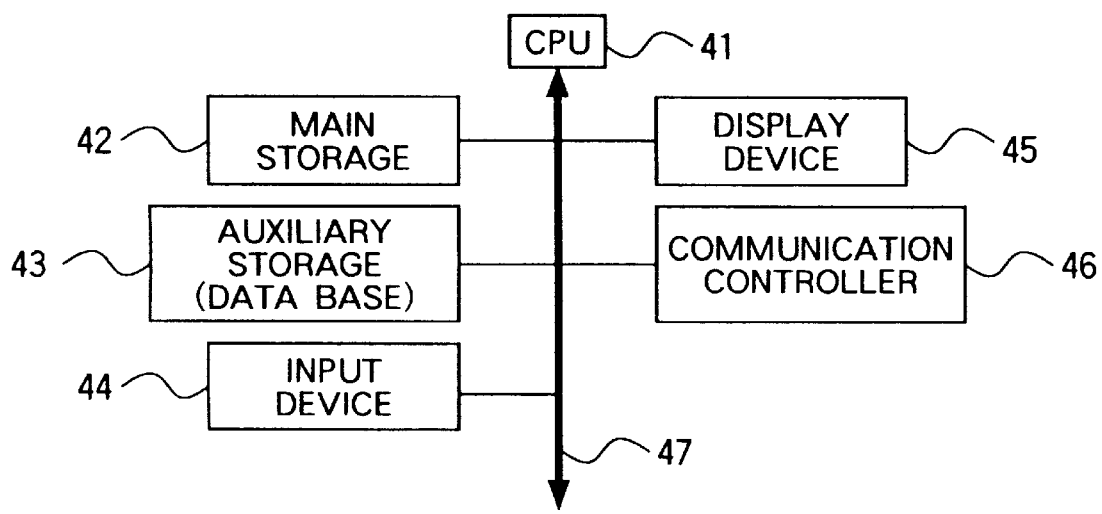
FIG. 3 is a schematic hardware block diagram of a reservation center and a status information IP in the present embodiment.

FIG. 3 is a hardware block diagram of the reservation centers 40a and 50a and the status information IP's 60a and 70a in the present embodiment.

In FIG. 3, reference numeral 41 denotes a CPU, numeral 42 a main storage, numeral 43 an auxiliary storage, numeral 44 an input device, numeral 45 a display device, numeral 46 a communication controller, and numeral 47 a bus.

The main storage 42 is particularly realized by a ROM, a RAM or the like. The auxiliary storage 43 is composed of a program storing section and the reservation information data base 40b or 50b, or a program storing section and the status information data base 60b or 70b. Particularly, the program storing section is realized by a floppy disk, a hard disk, an IC card or the like and the reservation information data base or the status information data base is realized by a hard disk, an optical disk or the like. The input device 44 is particularly realized by a keyboard, a pointing device such as a mouse, or the like. The display device 45 is particularly realized by a CRT display, a liquid crystal display or the like and a controller for the display. The communication controller 46 is particularly realized by a modem, a network adaptor, a public radio transceiver or the like. These constituent elements are connected to the CPU 41 through the bus 47.

Figure 4:
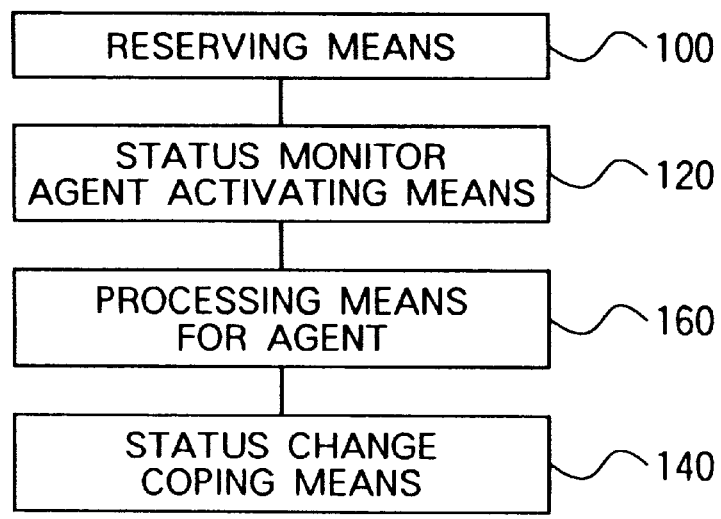
FIG. 4 is a functional block diagram of the portable information terminal in the present embodiment.

FIG. 4 shows a functional block diagram of the portable information terminal 10a, 10b or 10c shown in FIG. 1 in the present embodiment.

In FIG. 4, reference numeral 100 denotes reserving means, numeral 120 status monitor agent activating means, numeral 160 processing means for agent, and numeral 140 status change coping means. These functional blocks are realized in such a manner that the CPU 11 executes programs stored in the main storage 12 or the auxiliary storage 13.

The reserving means 100 displays a group of icons representative of the objects of reservation on the display device 15. The reserving means 100 makes access to a reservation center corresponding to an object of reservation selected by a user by use of the input device 14 to generate a reservation management data structure on the basis of the details of the reservation inputted thereafter by the user and makes a reservation to the reservation center. The reservation management data structure will be mentioned later on. Further, the reserving means 100 displays a path to a place for execution of the reserved matter on the display device 15 and extracts status information (or information for making the judgement of the execution of he user's reserved matter as being difficult) related to a path selected or newly inputted by the user by use of the input device 14 in accordance with the displayed path to register the extracted status information into a status information coping table which will be mentioned later on.

The status monitor agent activating means 120 generates an agent parameter from the status information related to the object of reservation and the reservation management data structure so that an agent (composed of a program) for always monitoring the status information is delivered to the status information IP or is activated in its own terminal. The agent parameter will be mentioned later on.

The processing means 160 for agent monitors a temporal change in various status information always to activate the status change coping means 140 when a change in status given beforehand by the agent parameter occurs. The processing means 160 for agent is divided into four processing means including processing means 161 for an agent to perform the monitoring in a status information IP, processing means 162 for an agent 1 to perform the monitoring in its own terminal (the communication with another terminal), processing means 163 for an agent 2 to perform the monitoring in its own terminal (the reception of broadcasted status information), and processing means 164 for an agent 3 to perform the monitoring in its own terminal (the monitoring of status information which cannot be obtained from the status information IP).

The status change coping means 140 judges the content of a change in status captured by the agent to execute means for coping therewith. The coping means includes informing the user that the execution of a reserved matter is being difficult, cancelling the reservation, determining a time from its own position to a place for execution of the reserved matter to make a re-reservation onto the optimum time, presenting alternative means to execute a reservation associated therewith, and so forth.

Figure 5:
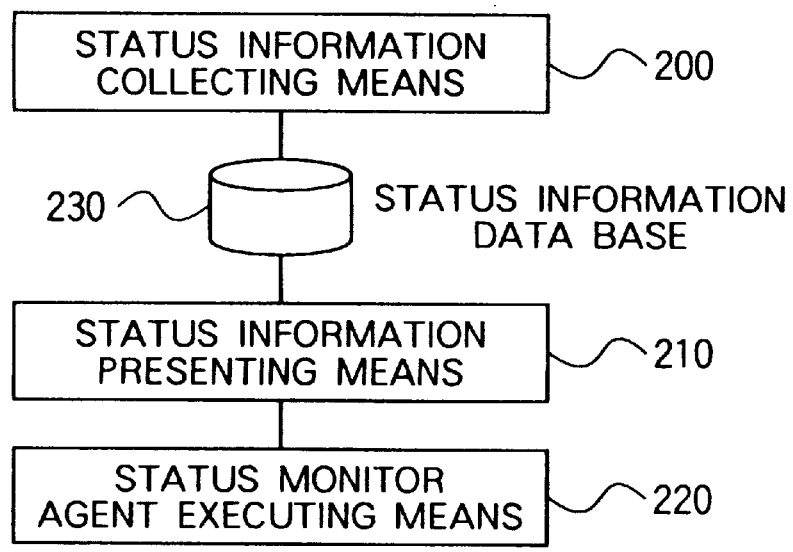
FIG. 5 is a functional block diagram of the status information IP in the present embodiment.

FIG. 5 is a functional block diagram of the status information IP 60a or 70b shown in FIG. 1 in the present embodiment.

In FIG. 5, reference numeral 200 denotes status information collecting means, numeral 210 status information presenting means, numeral 220 status monitor agent executing means, and numeral 230 a status information data base. These functional blocks are realized in such a manner that the CPU 41 executes programs stored in the main storage 42 or the auxiliary storage 43.

In the status information collecting means 200, information related to the status information managed by the status information IP is periodically acquired from another IP or the like to update the status information data base 230.

The status information presenting means 210 presents the content of the status information data base 230 to the processing means 161 for an agent which is operating in the status information IP.

The status monitor agent executing means 220 executes an agent transferred into the status information IP while checking the agent existence terms for all of agents which are operating in the status information IP. If there is an agent the existence term of which is elapsed, the status monitor agent executing means 220 stops the execution of the corresponding agent and erases the agent.

The status information data base 230 holds the latest status information. Since the status information data base 230 can be constructed through the application of the conventional technique, the detailed description thereof will be omitted.

Figure 6:
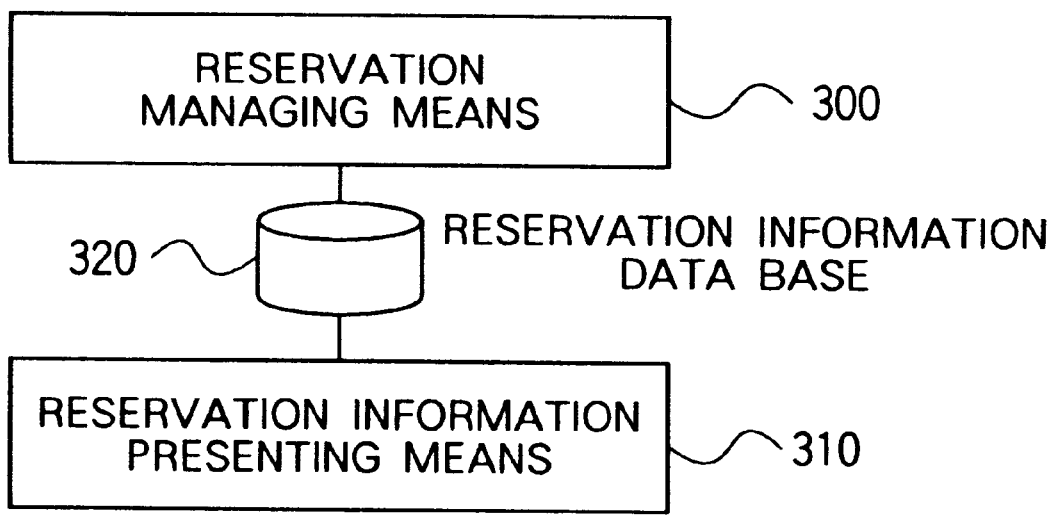
FIG. 6 is a functional block diagram of the reservation center in the present embodiment.

FIG. 6 is a functional block diagram of the reservation center 40*a* or 50*a* shown in FIG. 1 in the present embodiment.

In FIG. 6, reference numeral 300 denotes reservation managing means, numeral 310 reservation information presenting means, and numeral 320 a reservation information data base. These functional blocks are realized in such a manner that the CPU 41 executes programs stored in the main storage 42 or the auxiliary storage 43.

The reservation managing means 300 judges whether or not a reservation is possible. The judgement is made on the basis of information of a reservation request sent from a portable information terminal and the content of the reservation information data base 320. When the judgement of the reservation as being possible is made, the reservation managing means 300 updates the reservation information data base 320 (to accept the reservation) and informs the portable information terminal that the reservation is completed. On the other hand, when the judgement of the reservation as being not possible is made, the reservation managing means 300 informs the portable information terminal that the reservation is not possible.

The reservation information presenting means 310 presents the content of the reservation information data base 320 to the portable information terminal.

The reservation information data base 320 holds the latest reservation information. Since the reservation information data base 320 can be formed through the application of the conventional technique, the detailed description thereof will be omitted.

Next, description will be made of a data structure used by a program according to the present invention and the contents of the data structure.

FIG. 7 shows the construction of a reservation management data structure 400 in the portable information terminals 10*a* to 10*c*. One reservation management data structure 400 is generated for one object reserved by a user and holds the detailed contents of the reservation. The reservation management data structure 400 is stored into the main storage 12 with an address allotted to each data structure.

As shown in FIG. 7, the reservation management data structure 400 is composed of an ID 410, a reservation object category 420, a reservation number 430, a reservation date 440, a pointer 450 to data by category, a pointer 460 indicating the address of a reservation management data structure of the preceding reservation on the main storage 12, and a pointer 470 indicating the address of a reservation management data structure of the succeeding reservation on the main storage 12.

The ID 410 is set with an identifier which is arbitrarily allotted to the reservation management data structure 400. Namely, the ID 410 is an identifier indicating an object reserved by a user.

The reservation object category 420 is set with an identifier indicating what is an object of reservation. In the present embodiment, the reservation of a seat on a train or airplane, the reservation at a restaurant, the reservation at a hotel, the reservation of a conference with another user and so forth are supposed as the objects of reservation. However, the application is possible to another reservation such as the reservation on a physician.

The reservation number 430 is set with a number sent from a reservation center at a point of time of completion of the reservation. The user presents this reservation number when he or she executes the reserved matter. However, in the case of the reservation of a conference with another user, a number for access to a portable information terminal possessed by the other user is set as the reservation number 430.

The reservation date 440 is set with a date when the reserved matter is to be executed. The set value is a value inputted by the user beforehand through the activation of the reserving means 100.

The pointer 450 to data by category is a pointer which is stored in the reservation object category 420 and indicates the address of a reservation data group peculiar to the object of reservation on the main storage 12. The reservation data group is a structure for holding various data designated at the time of reservation. This structure is stored in the main storage 12. For example, in the case of the reservation on a train, a train number, a get-in station and a get-off station are stored as the reservation data group.

The pointer 460 to reservation management data structure of preceding reservation is set with a pointer to the reservation management data structure 400 of a reservation which may cause the change of a reservation indicated by the reservation management data structure 400 under consideration. For example, provided that the reservation of C train from A station to B station is followed by the reservation of E train from B station to D station, a pointer 460 to reservation management data structure of preceding reservation in a reservation management data structure 400 of the reservation of E train is set with a pointer to a reservation management data structure 400 of the reservation of C train. Namely, it is indicated that if the C train has a large delay behind a scheduled instant of time, it becomes impossible to get in the E train so that a change in reservation becomes necessary. A pointer 470 to reservation management data structure of succeeding reservation in the reservation management data structure 400 of the reservation of C train is set with a pointer to the reservation management data structure 400 of the reservation of E train.

The pointer 470 to reservation management data structure of succeeding reservation is set with a pointer to the reservation management data structure 400 of a reservation having a possibility that the reservation needs a change thereof when a reservation indicated by the reservation management data structure 400 under consideration is changed. For instance, in the above-mentioned example, a pointer 470 to reservation management data structure of succeeding reservation in the reservation management data structure 400 of the reservation of C train is set with a pointer to the reservation management data structure 400 of the reservation of E train.

A series of reservation chains can be indicated from the content of the pointer 460 to reservation management data structure of preceding reservation and the content of the pointer 470 to reservation management data structure of succeeding reservation.

FIG. 8 shows the construction of a reservation management table 500 in the portable information terminals 10a to 10c. The reservation management table 500 is provided for managing reservation chains indicated from the content of the pointer 460 to reservation management data structure of preceding reservation and the content of the pointer 470 to reservation management data structure of succeeding reservation. The management is made for each chain of reservations. The reservation management table 500 is stored in the main storage 12.

As shown in FIG. 8, the reservation management table 500 is composed of an ID 510, a pointer 520 to leading reservation management data structure, and a reservation term 530.

The ID 510 is set with any identifier allotted to a chain of reservations.

The pointer 520 to leading reservation management data structure is set with a pointer indicating the address of a leading reservation management data structure 400 in the reservation chain on the main storage 12.

The reservation term 530 is set with a term from a date of execution of a reserved matter for the first reservation in the reservation chain to a date of execution of a reserved matter for the last reservation.

Namely, there are set the content of a reservation date 440 in a reservation management data structure 400 of the first reservation and the content of a reservation date 440 in a reservation management data structure 400 of the last reservation.

Figure 27:
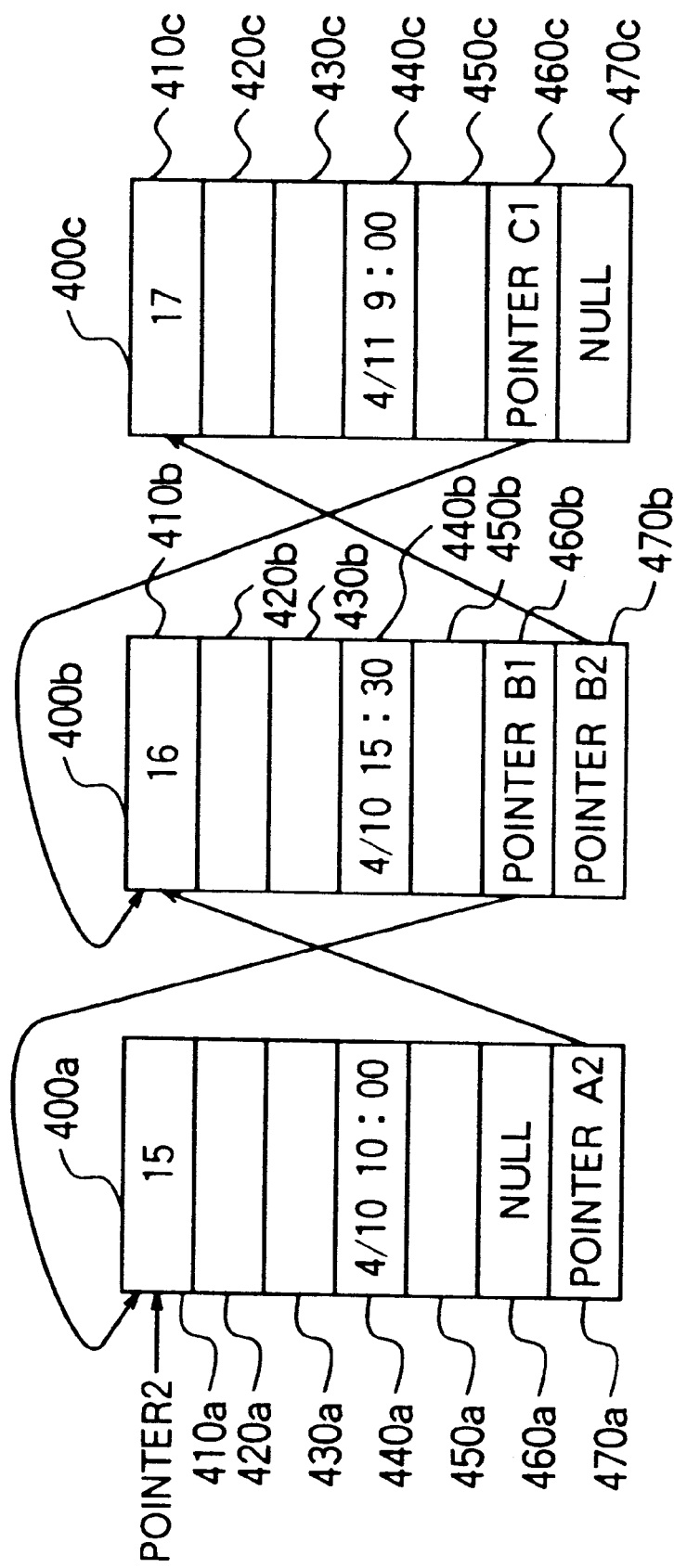
FIG. 27 is a diagram showing an example of a chain of reservations using the reservation management table shown in FIG. 8.

FIG. 27 shows an example of a reservation chain for which the ID 510 in FIG. 8 is "2".

In FIG. 27, the reservation chain is composed of three reservation management data structures 400a to 400c. An arrow shown in the figure shows that each pointer indicates the address of another reservation management data structure on the main storage. Pointer 2, which is the content of the pointer 520 to leading reservation management data structure shown in FIG. 8, is a pointer indicating the address of the reservation management data structure 400a on the main storage 12. The reservation management data structure 400a is the lead of the reservation chain. Therefore, a pointer 460a to reservation management data structure of preceding reservation in the reservation management data structure 400a is set with NULL. Also, the reservation management data structure 400c is the last of the reservation chain. Therefore, a pointer 470c to reservation management data structure of succeeding reservation in the reservation management data structure 400c is set with NULL. Further, the content of the reservation term 530 shown in FIG. 8 is derived from the contents of the reservation dates 440a and 440c in the reservation management data structures 400a and 400c. Also, it is assumed that the contents of 420a to 420c, 430a to 430c and 450a to 450c in the reservation management data structures shown in FIG. 27 are actually set with any proper data though they are not shown.

FIG. 9 shows the construction of a status information coping table 600 in the portable information terminals 10a to 10c. The status information coping table 600 is provided for setting, in regard to a certain reservation, a status information IP which provides information for judging the possibility of obstruction of the execution of a matter reserved by a user. The status information coping table 600 is stored in the main storage 12.

As shown in FIG. 9, the status information coping table 600 is composed of a reservation ID 610, a number 620 for access to status information IP, and an agent existence location 630.

The reservation ID 610 is set with an identifier indicating a certain reservation, that is, the content of an ID 410 in the reservation management data structure 400 of that reservation.

The number 620 for access to status information IP 620 is set, in regard to a reservation indicated by the reservation ID, with a number for access to a status information IP which provides information for judging the possibility of obstruction of the execution of a matter reserved by a user. In the case where there are a plurality of such information, a plurality of entries are generated for one reservation ID. In the case where the information is transmitted to a portable information terminal in a broadcasting form, a frequency for receiving the broadcasting is set. In the case where the reservation is the reservation of a conference with another user or the like, a number for access to a portable information terminal possessed by the other user is set. Also, in the case where the content of the number 620 of access to status information IP is NULL, it is indicated that what obstructs the execution of a matter reserved by a user is a status unobtainable from a user's will or the status information IP (for example, the case where a car gets into a breakdown during movement by the car to a place for execution of the reserved matter).

The agent existence location 630 is set with the existing location of an agent for monitoring a temporal change in status information. If the content of the agent existence location 630 is "1", it is indicated that the agent is executed in a corresponding status information IP. If it is "2", it is indicated that the agent is executed in its own terminal. In the case where the status information is a broadcasting or in the case where the status information is a status unobtainable from a user's will or the status information IP or is an appointment with another terminal, the agent is executed in its own terminal. In the other case, the agent is executed in a corresponding status information IP.

FIG. 10 shows the construction of an agent parameter 700 in the portable information terminals 10a to 10c. The agent parameter 700 defines the operation of an agent and is stored in a work area of an agent to be executed. In particular, the work area is ensured in the main storage 12 or 42 of an environment (its own terminal or a status information IP) in which the agent is executed.

As shown in FIG. 10, the agent parameter 700 is composed of an agent number 710, filtering information 720, a feedback condition 730 and an existence term 740.

The agent number 710 is set with an identifier which is arbitrarily allotted to each agent.

The filtering information 720 is set with information for filtering massive information provided from a status information IP to extract only necessary information.

The feedback condition 730 is set with a condition with which the agent is fed back to its own terminal to activate the status coping processing means 140. Namely, the content of the feedback condition 730 shows a condition with which there falls into a situation in which the execution of a reserved matter becomes difficult.

The existence term 740 is set with a term (or date) in which the agent can be executed. An agent with its existence term having expired is eliminated from the main storage 12 or 42.

FIG. 11 shows the construction of an execution agent management table 800 in the portable information terminals 10a to 10c. The execution agent management table 800 makes the one-way management of all agents which are being executed in its own terminal or a status information IP.

As shown in FIG. 11, the execution agent management table 800 is composed of an agent number 810, a reservation ID 820, a number 830 for access to status information IP, and an agent existence location 840.

The agent number 810 is set with an identifier of each agent, that is, the content of the agent number 710 in the agent parameter 700.

In order to indicate what reservation an agent identified by the agent number 810 is monitoring status information for the sake of, the reservation ID 820 is set with the content of the ID 410 in the reservation management data structure 400 of that reservation.

The pointer 830 to status information IP is set with the content of the number 620 for access to status information IP in the status information coping table 600.

The existence location 840 is set with the content of the agent existence location 630 in the status information coping table 600 in order to indicate which status information IP the agent identified by the agent number 810 is being executed in.

Next, the operation of the present embodiment will be described by use of the drawings.

In the case where a user wants to make a reservation in regard to any object of reservation, the reserving means 100 operating on the portable information terminal is activated by some method.

Figure 12:
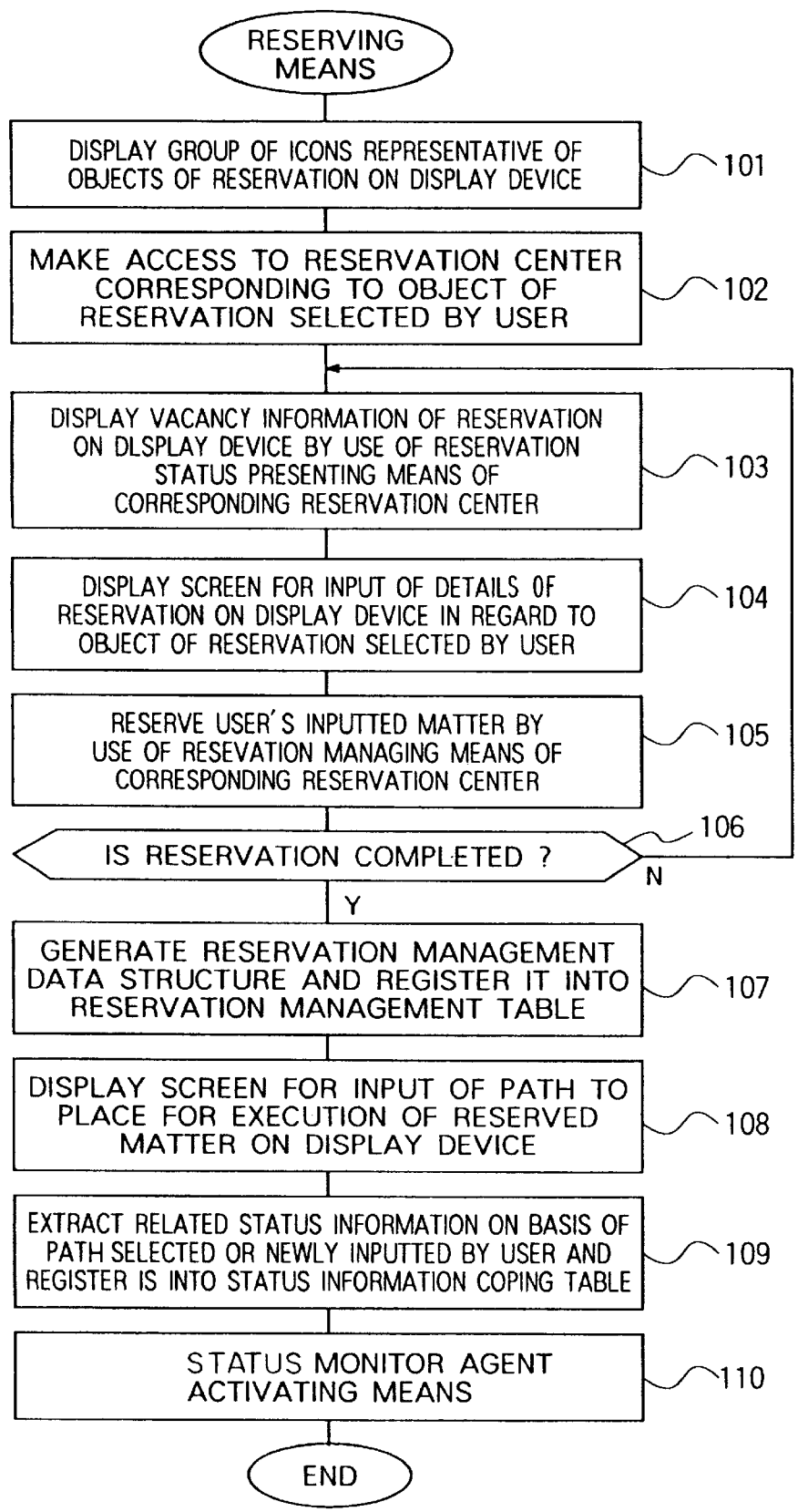
FIG. 12 is a process flow chart of reserving means in the present embodiment.

FIG. 12 is a process flow chart of the reservation processing means 100. A program for performing this process is stored in the main storage 12 or the auxiliary storage 13 in the portable information terminal and is executed by the CPU 11.

As shown in FIG. 12, the reserving means 100 first displays a group of icons representative of the objects of reservation on the display device 15 (step 101). The contents displayed on the display device 15 at this time are shown in FIG. 13.

In FIG. 13, reference numeral 1000 denotes a display screen on the display device 15, numeral 1010 an icon for making the reservation of seat on a train, numeral 1020 an icon for making the reservation of seat on an airplane, numeral 1030 an icon for making the reservation of seat on a bus, numeral 1040 an icon for making the reservation of room at a hotel, numeral 1050 an icon for making the reservation at a restaurant, and numeral 1060 an icon for making the reservation of conference with another user. The user uses the input device 14 to select an icon indicating an object in regard to which he or she wants to make a reservation.

Of course, icons other than the enumerated objects of reservation may be displayed to make reservations.

Returning to FIG. 12, the reserving means 100 makes access to a reservation center corresponding to the object of reservation selected by the user (step 102). An access number for access to the reservation center at this time is stored in the auxiliary storage 13 beforehand. Vacancy information of reservation is acquired from the corresponding reservation center and is displayed on the display device 15 (step 103). At this time, the vacancy information of reservation can be acquired in such a manner that reservation information representing means 310 in the corresponding reservation center is performed. The details of the content of a processing will be mentioned later on.

Subsequently, a display screen for inputting the details of a reservation concerning the object of reservation selected by the user is displayed on the display device 15 (step 104). The contents displayed on the display device 15 at this time is shown in FIG. 14.

FIG. 14(a) shows, for example, a display screen for inputting the details of the reservation of seat on a train, and FIG. 14(b) shows, for example, a display screen for inputting the details of the reservation at a restaurant.

In FIG. 14(a), reference numeral 1100 denotes a field for inputting a reservation date, numeral 1200 a field for inputting a get-in station, numeral 1300 a field for inputting a get-off station, and numeral 1400 a field for inputting a train No.

In FIG. 14(b), reference numeral 1500 denotes a field for inputting a reservation date, numeral 1600 a field for inputting a reservation desired seat, and numeral 1700 a field for inputting a menu to be ordered at the restaurant. The user inputs the details of the reservation into each field properly.

Though not shown, selectable items may be registered in each field of FIG. 14 beforehand so that a list of such items are displayed to cause the user to select one item from the list. Further, if it is constructed such that a reservable item is also acquired in the reservation vacancy information acquiring step 103 shown in FIG. 12, it is possible to provide a system which is easier to use. For example, in FIG. 14(b), since the designation of a restaurant specifies reservable menus of the designated restaurant, a list of menus acquired in step 103 is displayed on the menu input field 1700. Also, if a reservation date is designated by the date input field 1500, a seat reservable on the designated date can also be specified.

Returning to FIG. 12, the reserving means 100 successively makes a reservation to the corresponding reservation center on the basis of the details of the reservation inputted by the user (step 105). At this time, the reservation is made by reservation managing means 300 in the corresponding reservation center. The details of the contents of a process by the reservation managing means 300 will be mentioned later on.

When the reservation managing means 300 is executed, the reservation center sends back a result indicating whether or not the reservation is completed. (In the case where the reservation is completed, the result includes a reservation number.) The reservation means 100 checks this result (step 106). In the case where the judgement of the reservation as being not completed is made, the flow returns to step 103 so that the user inputs the details of the reservation again.

On the other hand, in the case where the judgement of the reservation as being completed is made, a reservation management data structure 400 is generated on the basis of the details of the reservation and the generated reservation management data structure 400 is registered into the reservation management table 500 (step 107). At this time, the contents set to a pointer 460 to reservation management data structure of preceding reservation and a pointer 470 to reservation management data structure of succeeding reservation can be derived as follows.

First, one of reservation chains having already been registered in the reservation management table 500 is extracted so that the content of the reservation date 440 in the generated reservation management data structure 400 is successively compared with the content of the reservation date 440 in a reservation management data structure 400 indicated by the content of a pointer 520 to leading reservation management data structure and with the content of the reservation date 440 in a reservation management data structure 400 indicated by the content of a pointer 470 to reservation management data structure in the reservation management data structure 400 indicated by the content of the pointer 520, thereby checking whether or not the generated reservation management data structure 400 is included in the extracted reservation chain. If the generated reservation management data structure is included in the extracted reservation chain, the pointers to the reservation management data structures for the preceding and succeeding reservations are respectively set to the pointer 460 to reservation management data structure of preceding reservation and the pointer 470 to reservation management data structure of succeeding reservation in the generated reservation management data structure. If the generated reservation management data structure is not included in the extracted reservation chain, the next reservation chain is extracted from the reservation management table 500 to carried out the similar. This operation is performed for all of the reservation chains registered in the reservation management table 500 until a reservation chain including the generated reservation management data structure is found out. If the generated reservation management data structure is included in none of the reservation chains, the generated reservation management data structure is newly registered into the reservation management table 500. Subsequently, the reserving means 100 displays a display screen for input of a path to a place for execution of the reserved matter on the display device 15 (step 108). On the basis of a path selected or newly inputted by the user, the reserving means 100 extracts status information related to the path to register the status information into the status information coping table 600 (step 109). For example, in the case where a user reserves a seat of an airplane departing from Narita Airport and moves by a car from Yokohama to Narita Airport by use of an expressway, jam information of the passing expressway and so forth and information for judging a status unobtainable from a user's will or the status information IP (for example, a breakdown of the car) are extracted as status information. Further, judging the location of existence of an agent for monitoring each status information, each data is registered into the status information coping table 600. Also, the path and its status information are associated with each other beforehand.

Finally, the status monitor agent activating means 120 is activated (step 110), thereby completing the process. The details of the activation of the status monitor agent activating means 120 will be mentioned later on.

Figure 15:
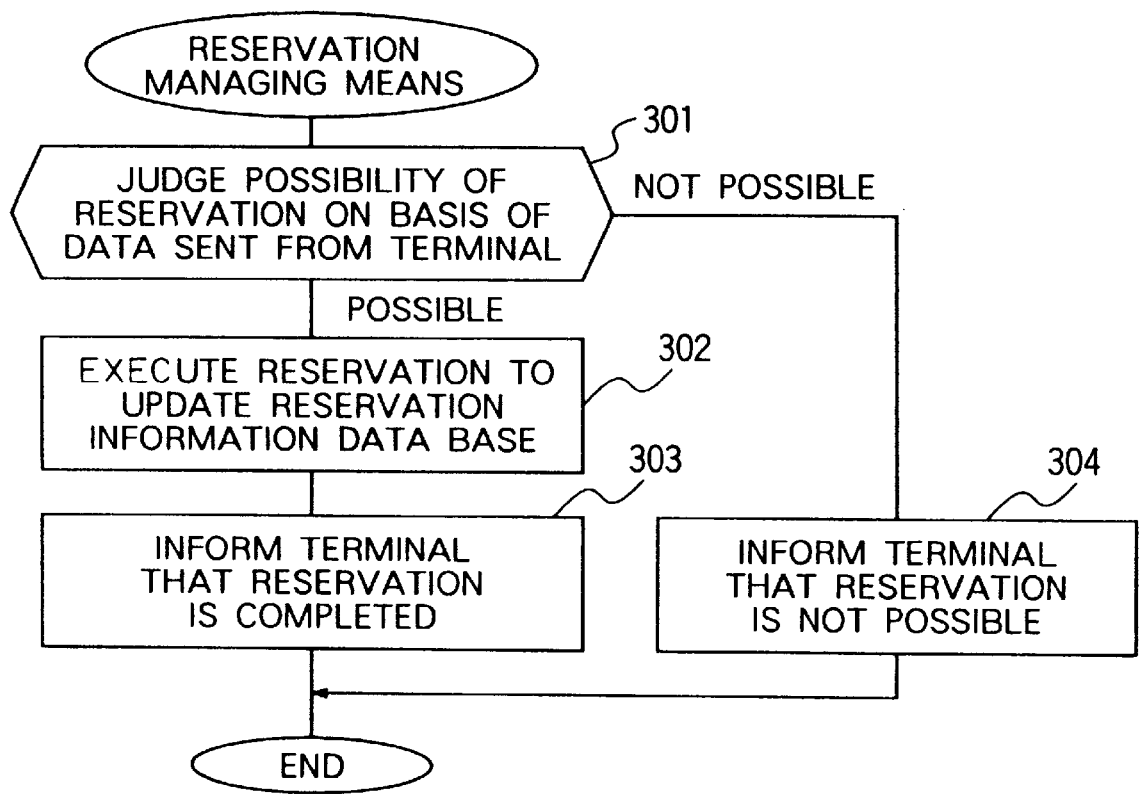
FIG. 15 is a process flow chart of reservation managing means in the present embodiment.

FIG. 15 is a process flow chart of the reservation managing means 300 in the reservation center 40a or 50a shown in FIG. 1. A program for realizing this process is stored in the main storage 42 or the auxiliary storage 43 of the reservation center 40a or 50a shown in FIG. 1 and is executed by the CPU 41.

As shown in FIG. 15, the reservation managing means 300 first makes, on the basis of the detailed information of a reservation sent from a portable information terminal 10a, 10b or 10c and the content of the reservation information data base 320, the judgement of whether or not the reservation under consideration is possible (step 301). In the case where the reservation is possible, the reservation managing means 300 updates the content of the reservation information data base 320 by the detailed information of the reservation (step 302). And, the reservation managing means 300 informs the portable information terminal of a reservation number indicating that the reservation is completed (step 303), thereby completing the process.

In the case where it is determined in step 301 that the reservation under consideration is not completed because another reservation is already present, the detailed information of the reservation under consideration is invalid, or the like, the reservation managing means 300 informs the portable information terminal of that effect (step 304), thereby completing the process.

Figure 16:
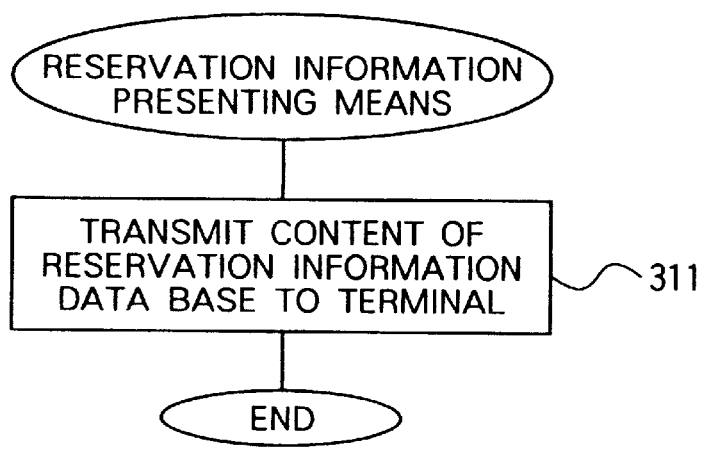
FIG. 16 is a process flow chart of reservation information presenting means in the present embodiment.

FIG. 16 is a process flow chart of the reservation information presenting means 310 in the reservation center. A program for realizing this process is stored in the main storage 42 or the auxiliary storage 43 of the reservation center and is executed by the CPU 41 in the juncture of a reservation information presenting request from a portable information terminal.

As shown in FIG. 16, the reservation information presenting means 310 transmits the content of the reservation information data base 320 to the requesting portable information terminal (step 311), thereby completing the process.

Figure 17:
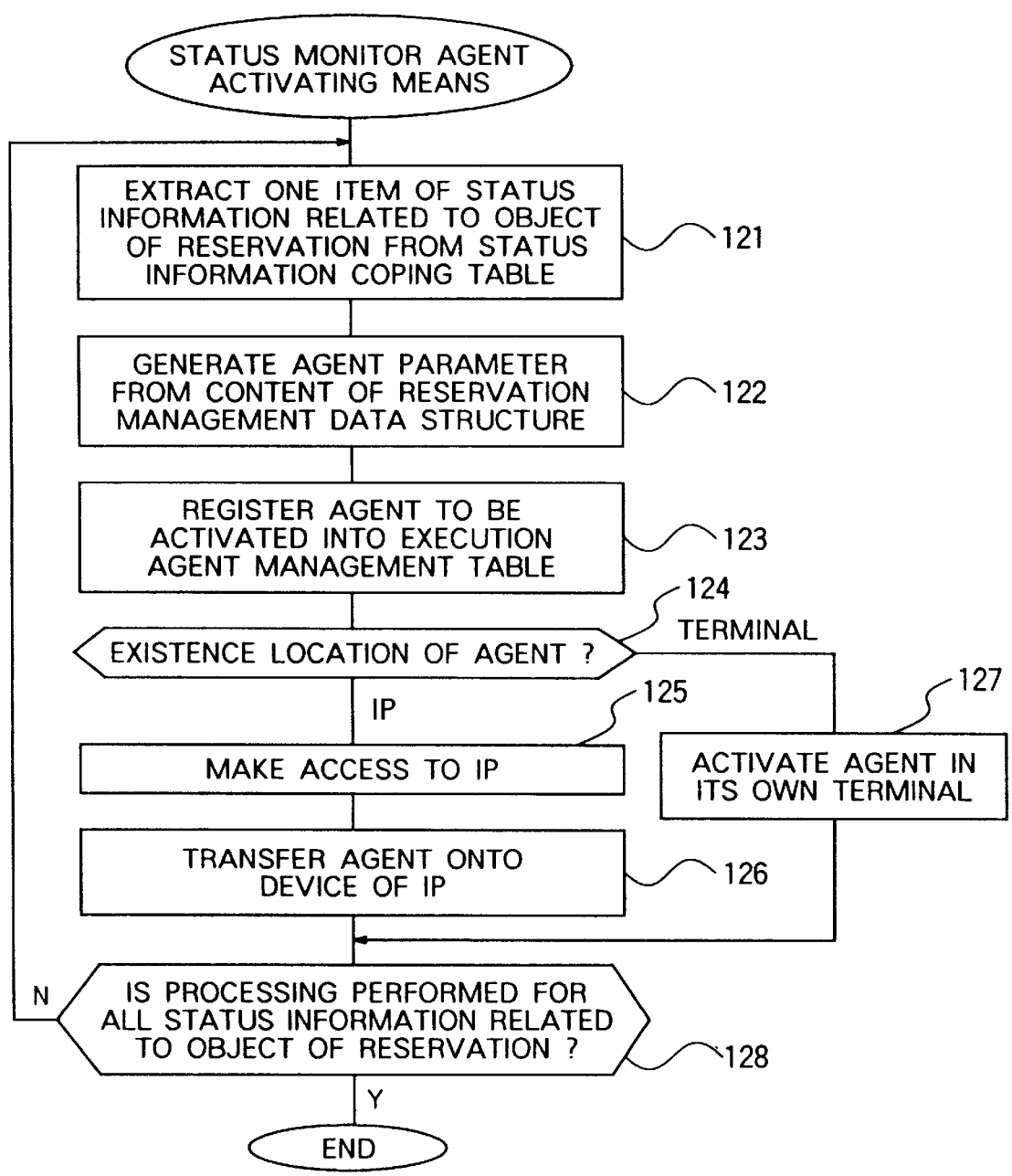
FIG. 17 is a process flow chart of status monitor agent activating means in the present embodiment.

FIG. 17 is a process flow chart of the status monitor agent activating means 120. A program for realizing this process is stored in the main storage 12 or the auxiliary storage 13 in a portable information terminal and is executed by the CPU 11.

As shown in FIG. 17, the status monitor agent activating means 120 first extracts one item of status information related to an object reserved by a user from the status information coping table (step 121) and generates an agent parameter 700 from the content of a reservation management data structure of this reservation and the path information acquired in step 109 in FIG. 12 (step 122). At this time, filtering information 720 in the agent parameter 700 is set, for example, if the path is a railway, with information of that railway and so forth and if the path is an expressway, with jam information of that expressway and so forth. A feedback condition 730 is set with, for example, the delay of a train, the degree of jam or the like for which the arrival at a place for execution of the reserved matter until a reservation date 440 in a reservation management data structure 400 of the reservation is judged as being not possible. When status information monitored by the agent matches this condition, the status change coping means 140 shown in FIG. 4 is activated.

Subsequently, the status monitor agent activating means 120 registers an agent to be activated into the execution agent management table 800 (step 123). Also, the status monitor agent activating means 120 generates the content of each item in the execution agent management table 800 from the content of the status information coping table 600 and the content of the parameter 500 and registers it.

Then, the status monitor agent activating means 120 judges a location for execution of the agent from the content of an agent existence location 840 in the execution agent management table 800 (step 124). If the agent is to be executed in a status information IP, access to a status information IP having a number 830 for access to status information IP in the execution agent management table 800 is made (step 125) to transer the agent onto the corresponding status information IP (step 126). The transfer is made through the public radio transceiver 16 and the wire/radio communication network 80.

On the other hand, in the case where it is determined in step 124 that the existence location of the agent is in its own terminal, the agent is activated in its own terminal (step 127).

The above processing from step 121 to step 127 is performed for all status information related to the object reserved by the user by use of the reserving means 100 (step 128), thereby completing the process.

Figure 25:
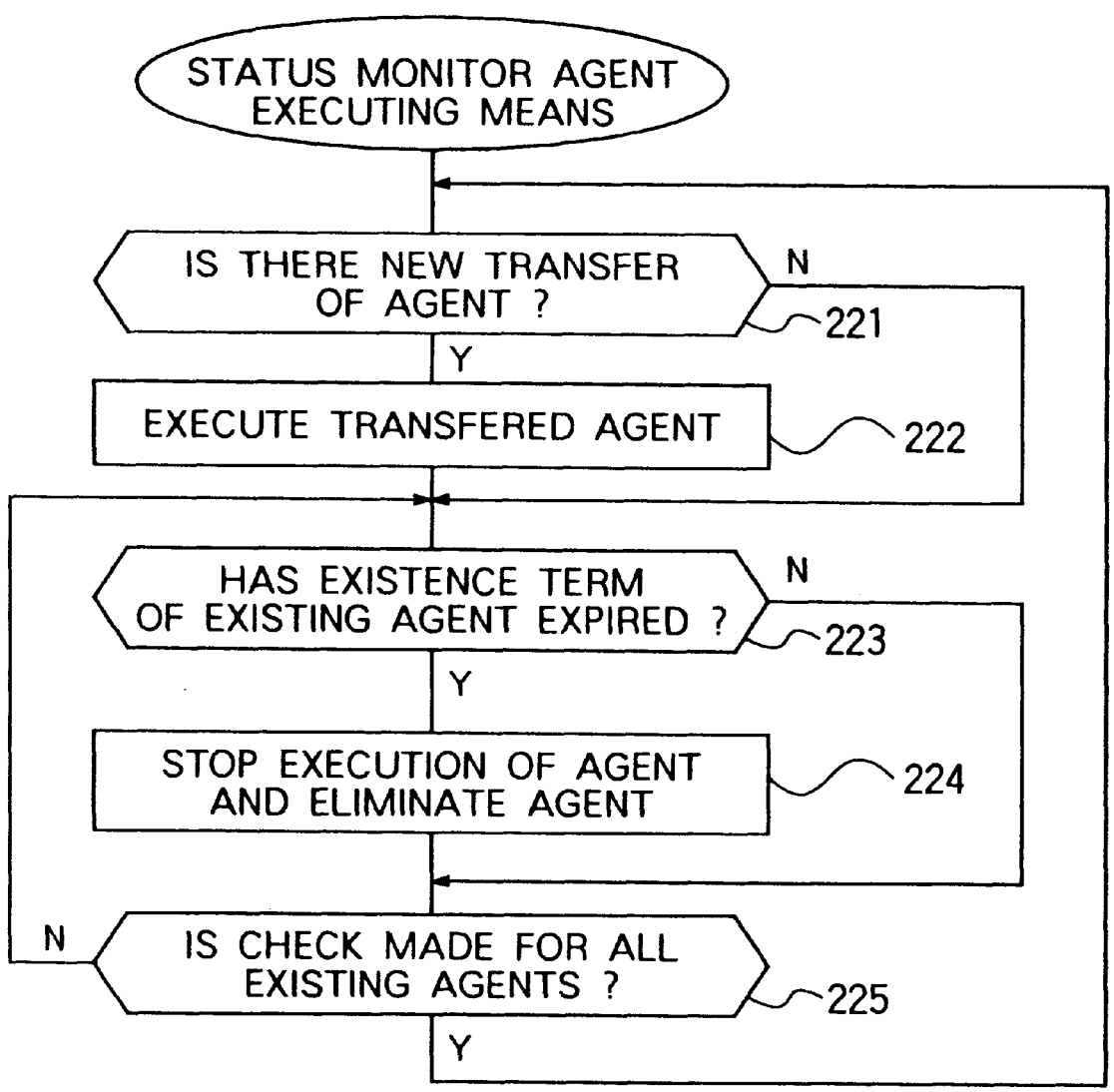
FIG. 25 is a process flow chart of status monitor agent executing means in the present embodiment.

FIG. 25 is a process flow chart of the status monitor agent executing means 220. A program for realizing this process is stored in the main storage 42 or the auxiliary storage 43 in a status information IP in which the agent operates. The program is executed by the CPU 41.

As shown in FIG. 25, the status monitor agent executing means 220 first examines whether or not there is the new transfer of an agent into the status information IP under consideration (step 221). If there is the transfer, the status monitor agent executing means 220 executes the transferred agent (step 222).

Subsequently, the status monitor agent executing means 220 examines the content of an existence term 740 in the agent parameter 700 of an agent which is existing (or operating) in the status information IP under consideration (step 223). If the existence term has expired, the status monitor agent executing means 220 stops the execution of the operating agent and eliminates the agent (step 224). The processing in steps 223 and 224 is checked for all agents which are existing (or operating) in the status information IP under consideration (step 225). Thereafter, the flow returns to step 221 to repeat this series of operations.

With the above processing, a user makes a reservation in regard to any object of reservation and a portable information terminal makes the automatic activation and execution of an agent which monitors status information for judging the execution of the reserved matter as being difficult. Hereinafter, the agent periodically checks a temporal change in status information.

Next, description will be made of the operation of the agent which monitors the temporal change in status information. Agents are broadly divided into an agent which operates in a status information IP and an agent which operates in its own terminal. The former is activated by the status monitor agent executing means 220 and the latter is activated by the status monitor agent activating means 120. Further, the agent operating in its own terminal is divided into an agent which waits for the communication from another terminal, an agent which monitors status information in a broadcasting form and an agent which monitors a status unobtainable from a user's own will or the status information IP.

The agent operating in the status information IP may be operable even in its own terminal without being transferred. In this case, status information is acquired by making periodic access to the status information IP. However, the line rent of the wire/radio communication network 80 for making the access to status information IP become large, which is uneconomical. Accordingly, the transfer of an agent into the status information IP for operating the agent therein can confine the use of the wire/radio communication network 80 to only the transfer of the agent, which is economical.

Figure 18:
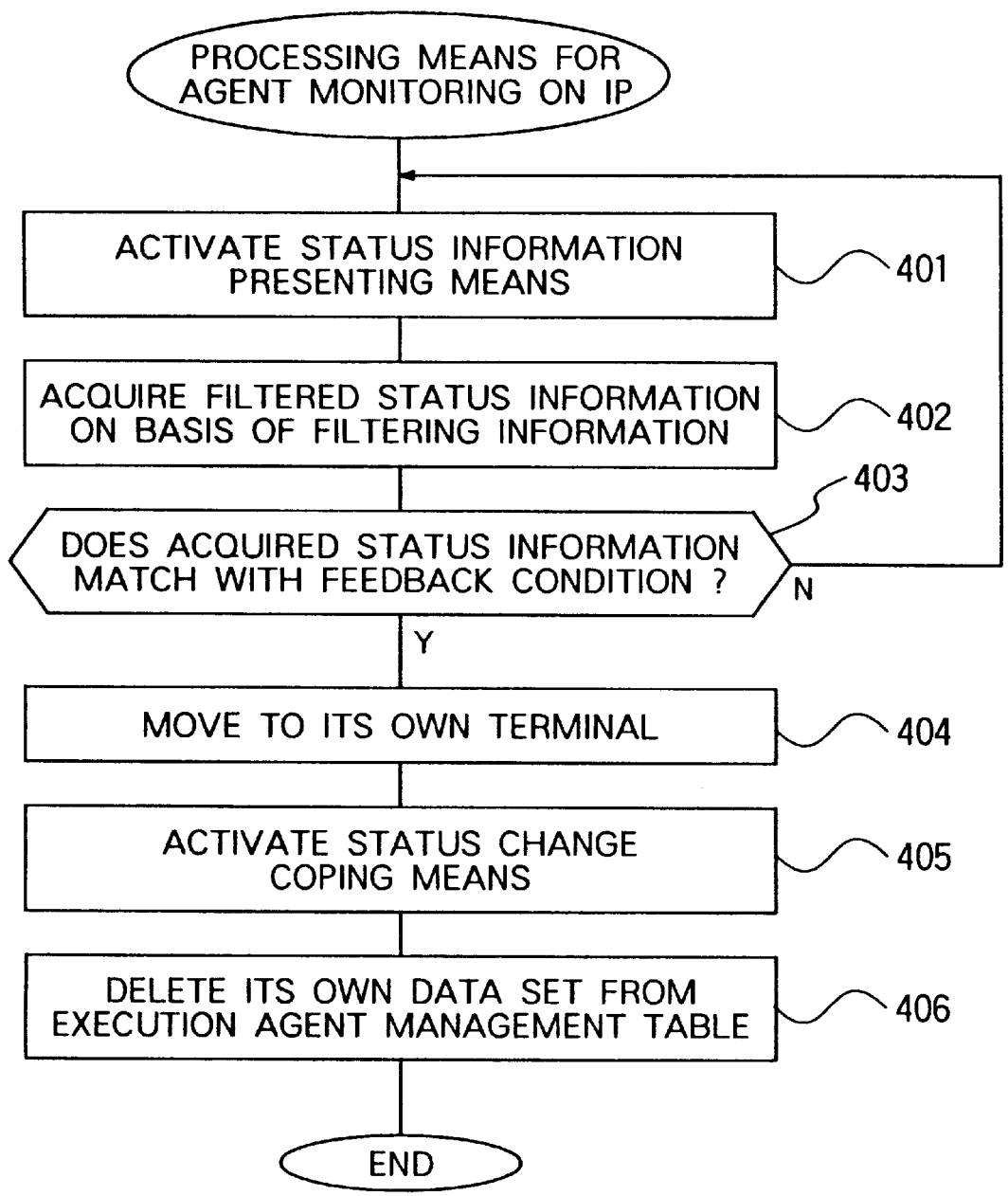
FIG. 18 is a flow chart of processing means for an agent monitoring on an IP in the present embodiment.

FIG. 18 is a process flow chart of the processing means 161 for an agent monitoring on an IP. A program for realizing this process is stored in the main storage 42 or the auxiliary storage 43 in a status information IP in which the agent under consideration operates. The program is executed by the CPU 41.

As shown in FIG. 18, the processing means 161 for an agent monitoring on an IP first activate status information presenting means 210 in the status information IP to acquire the content of the status information data base 230 which is the latest status information (step 401). Further, on the basis of the content of filtering information 720 in an agent parameter 700 of the agent under consideration, the processing means 161 selectively acquires the present necessary status information from among the information acquired in step 401 (step 402).

Then, the processing means 161 judges whether or not the acquired status information matches with the content of a feedback condition 730 in the agent parameter meter 700 of the agent under consideration (step 403). If the matching is not obtained, the flow returns to step 401 to repeat the process.

In the case where it is determined in step 403 that the acquired status information matches with the content of the feedback condition 730 in the agent parameter 700 of the agent under consideration, the agent moves to its own terminal by activating, by itself, a processing for transferring an agent in an status information IP is activated by the agent itself so that the agent is transferred to its own terminal (step 404) and the status change coping means 140 is activated (step 405). The details of a process by the status change coping means 140 will be mentioned later on.

Finally, its own data set is deleted from the execution agent management table 800 (step 406), thereby completing the process.

Figure 19:
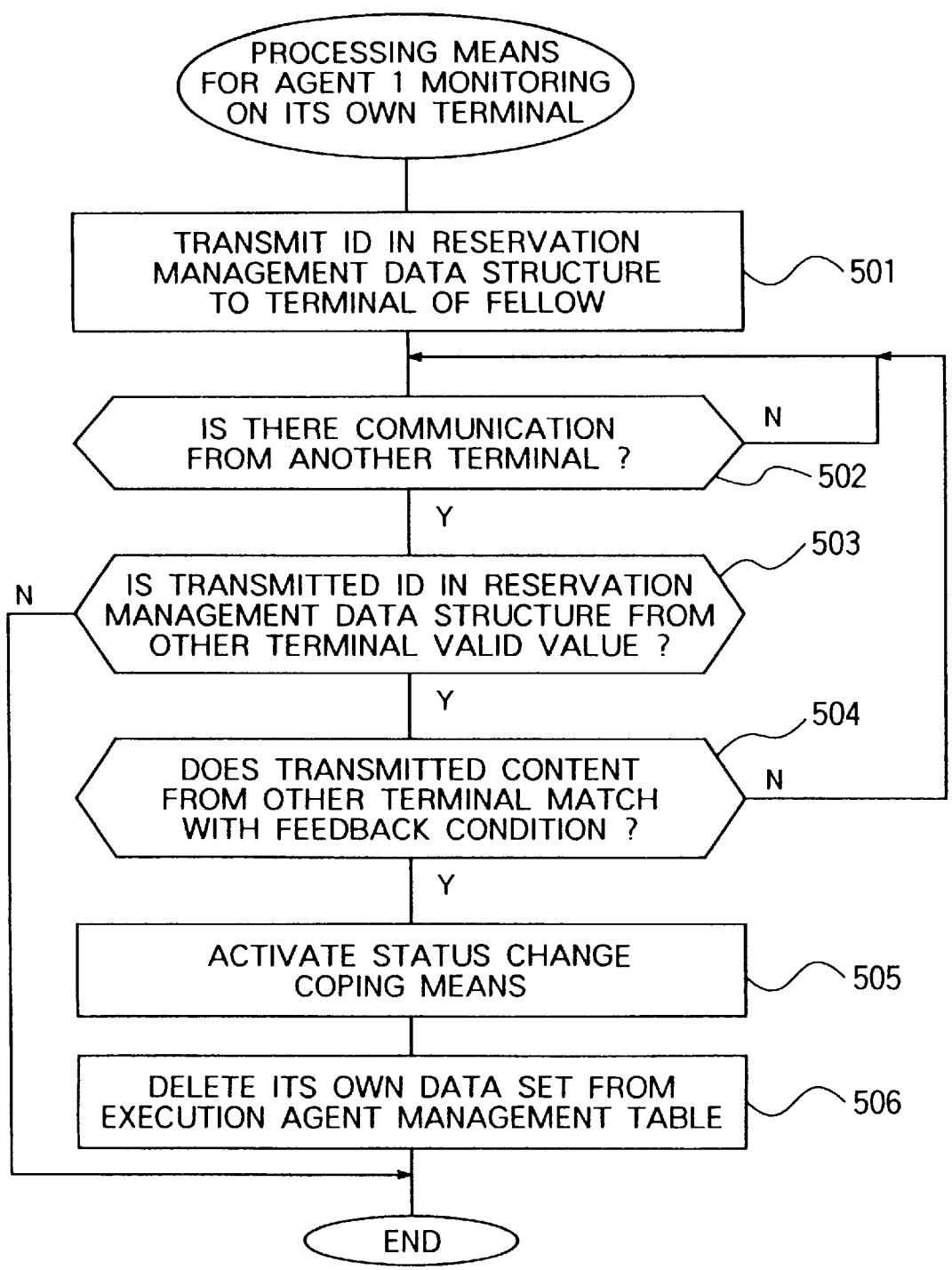
FIG. 19 is a flow chart of processing means for an agent 1 monitoring on its own terminal in the present embodiment.

FIG. 19 is a process flow chart of the processing means 162 for an agent 1 monitoring in its own terminal. A program for realizing this process is stored in the main storage 12 or the auxiliary storage 13 in a portable information terminal in which the agent under consideration operates. The program is executed by the CPU 11. The agent under consideration waits for a reservation change request from a fellow in appointment in the case where a reservation is the reservation of a conference with another user or the like.

As shown in FIG. 19, the processing means 162 for an agent 1 monitoring in its own terminal first transmits the content of an ID 410 in a reservation management data structure 400 of the reservation to a terminal of the fellow in appointment (step 501).

Then, the processing means 162 waits for a communication from another terminal inclusive of the terminal of the fellow in appointment (step 502). At this time, since there is a possibility that the content of an ID 410 in a reservation management data structure 400 is also sent from the other terminal, the examination is made of whether or not the received value is equal to the ID transmitted in step 501 (step 503). In the case where the received value is not equal to the ID transmitted in step 501, the process is completed making the judgement as being erroneously sent from the other terminal.

In the case where it is determined in step 503 that the received value is equal to the ID transmitted in step 501, the judgement is made of whether or not the content transmitted from the other terminal matches with the content of a feedback condition 730 in an agent parameter 700 of the agent under consideration (step 504). If the matching is not obtained, the flow returns to step 502 to wait for a communication from another terminal again.

In the case where it is determined in step 504 that the content transmitted from the other terminal matches with the content of the feedback condition 730 in the agent parameter 700 of the agent under consideration, the status change coping means 140 is activated (step 505). Finally, its own data set is deleted from the execution agent management table 800 (step 506), thereby completing the process.

Figure 20:
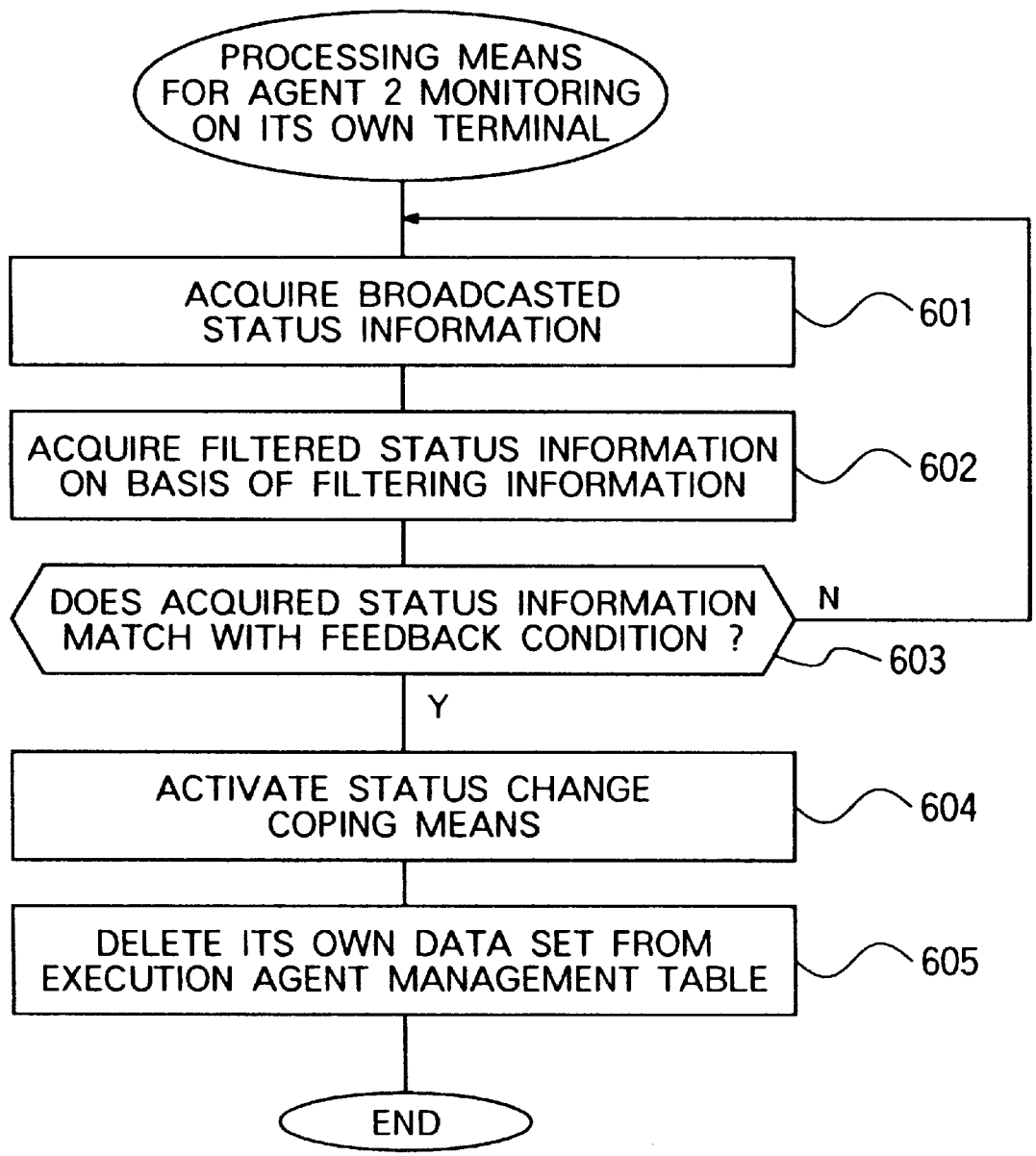
FIG. 20 is a flow chart of processing means for an agent 2 monitoring on its own terminal in the present embodiment.

FIG. 20 is a process flow chart of the processing means 163 for an agent 2 monitoring in its own terminal. A program for realizing this process is stored in the main storage 12 or the auxiliary storage 13 in a portable information terminal in which the agent under consideration operates. The program is executed by the CPU 11. The agent under consideration monitors information of a status for which the execution of a matter reserved by a user becomes difficult. The status information is received from a broadcasting.

As shown in FIG. 20, the processing means 163 for an agent 2 monitoring in its own terminal first acquires status information from a broadcasting (step 601) and acquires the present necessary status by filtering the information acquired in step 601 on the basis of the content of filtering information 720 in an agent parameter 700 of the agent under consideration (step 602).

Then, the processing means 163 judges whether or not the acquired status information matches with the content of a feedback condition 730 in the agent parameter 700 of the agent under consideration (step 603). If the matching is not obtained, the flow returns to step 601 to repeat the process.

In the case where it is determined in step 603 that the acquired status information matches with the content of the feedback condition 730 in the agent parameter 700 of the agent under consideration, the status change coping means 140 is activated (step 604). Finally, its own data set is deleted from the execution agent management table 800 (step 605), thereby completing the process.

Figure 21:
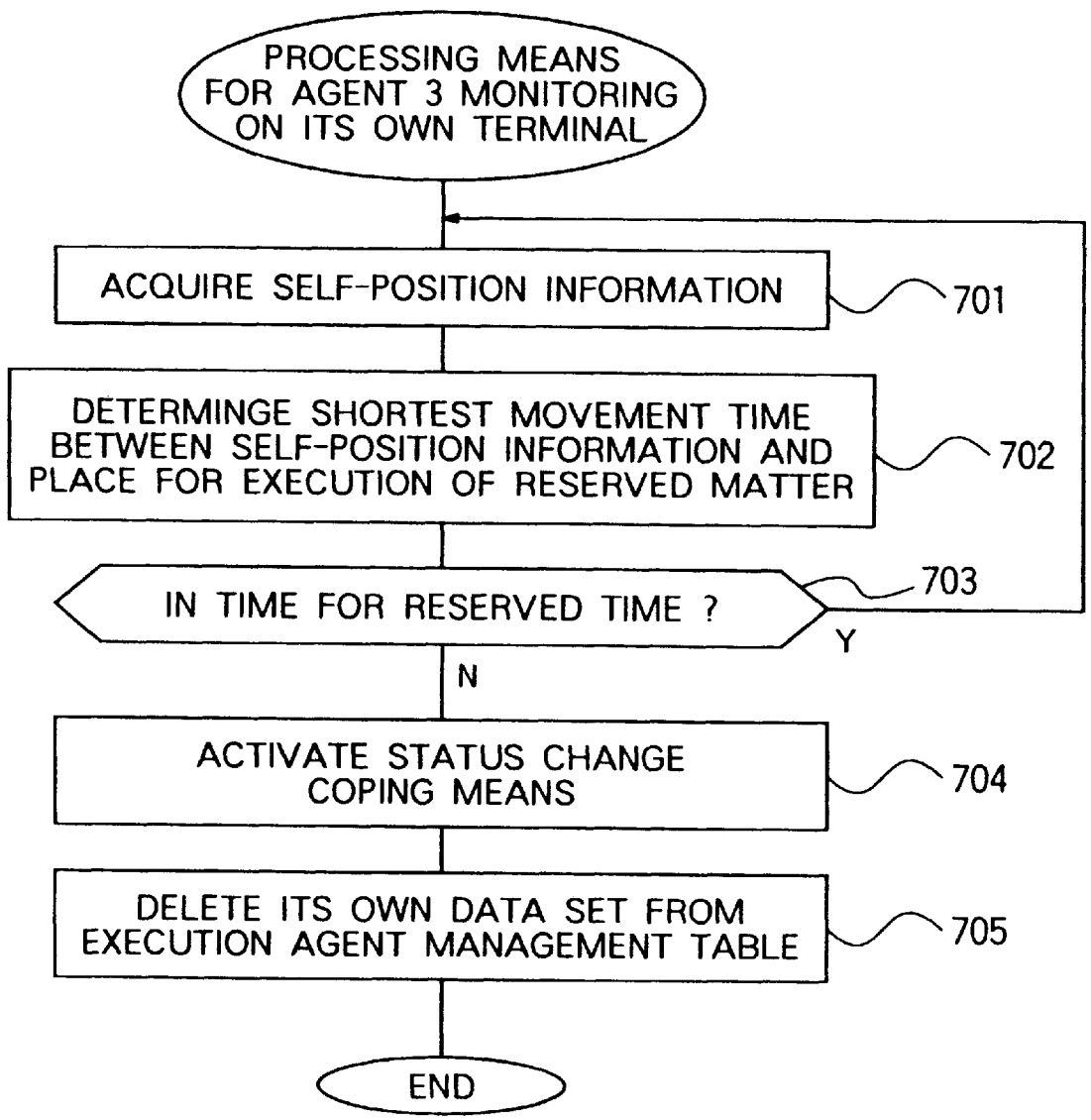
FIG. 21 is a flow chart of processing means for an agent 3 monitoring on its own terminal in the present embodiment.

FIG. 21 is a process flow chart of the processing means 164 for an agent 3 monitoring in its own terminal. A program for realizing this process is stored in the main storage 12 or the auxiliary storage 13 in a portable information terminal in which the agent under consideration operates. The program is executed by the CPU 11. The agent under consideration monitors status information which is unobtainable from a user's own will or a status information IP.

As shown in FIG. 21, the processing means 164 for an agent 3 monitoring in its own terminal first makes the periodic reception of electric waves from an artificial satellite for GPS by the GPS receiver 17 to determine the present position of the portable information terminal and the present instant of time on the basis of the received electric waves (step 701). Since a method for determining the present position of its own terminal and the present instant of time on the basis of the received electric waves has already been known, the detailed description thereof will be omitted.

Then, the shortest time to a place for execution of a matter reserved by a user is determined from that path to a place for execution of the matter reserved by the user which is acquired in step 109 shown in FIG. 12 and the present position of its own terminal (step 702). At this time, information necessary other than the above information, for example, map information or status information monitored by another agent is acquired from a dedicated IP or the other agent on occasion.

Subsequently, the shortest time determined in step 702 and a reservation instant of time (acquired from a reservation management data structure 400 of the reservation) are compared (step 703). In the case where it is determined that it is possible to go to the place for execution of the reserved matter until the reservation instant of time, the flow returns to step 701 to repeat the process.

In the case where it is determined in step 703 that it is impossible to go to the place for execution of the reserved matter until the reservation instant of time, the status change coping means 140 is activated (step 704). Finally, its own data set is deleted from the execution agent management table 800 (step 705), thereby completing the process.

Now consider the case where train X is used from A station to B station and train Y is used from B station to C station.

First, information required in step 702 may include map information, train diagram information related to the path, train delay information monitored by another agent, and so forth. Next, a method for specifying which position and which train a user is presently existing at and getting in will be shown. The position of its own terminal determined in step 701 is represented by the latitude and the longitude. By comparing this position with the map information, the train diagram information related to the path and the train delay information, it is possible to judge whether or not the user is getting in the train at the present time.

For example, in the case where it is determined in step 702 from the map information that the user is existing at A station at an instant of time when the user has already arrived at B station if there is no delay of train X, it is proved that the user missed train X. In this case, the original action schedule will be changed by the status change coping means 140. Also, in the case where the user is existing on the railway of train X beyond B station at an instant of time when train Y is travelling on a way between B station and C station, it can be determined that the user rode past in train X and the original action schedule will similarly be changed by the status change coping means 140.

Figure 22:
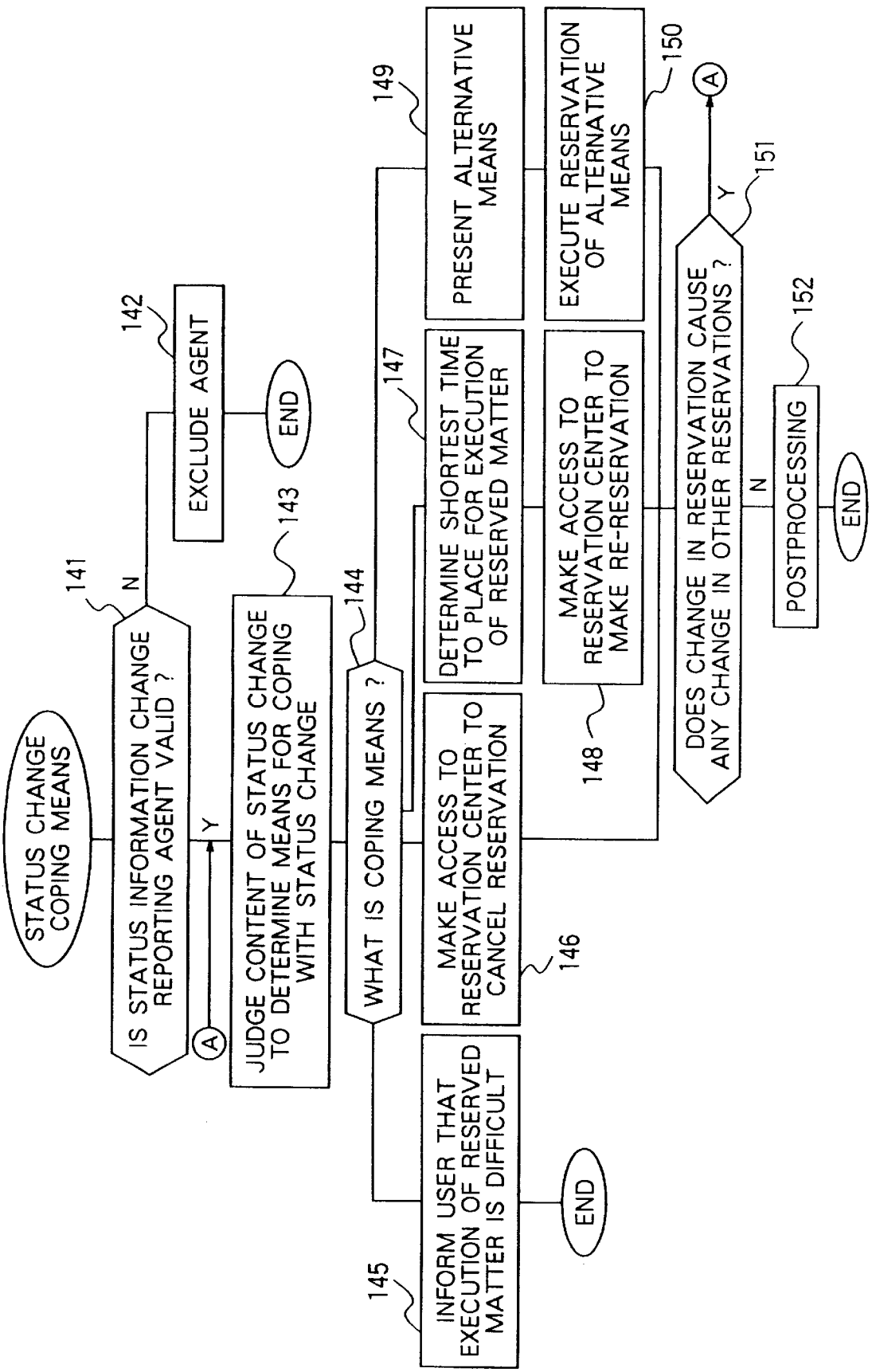
FIG. 22 is a process flow chart of status change coping managing means in the present embodiment.

FIG. 22 is a process flow chart of the status change coping means 140. A program for realizing this process is stored in the main storage 12 or the auxiliary storage 13 in a portable information terminal and is executed by the CPU 11 when an agent monitoring a temporal change in status information falls into a situation in which the execution of a matter reserved by a user is difficult.

As shown in FIG. 22, the status change coping means 140 first judges whether or not an agent reporting a change in status information is a valid agent (or an agent registered in the execution agent management table 800) (step 141). The judgement is made using an agent number or the like. If the agent is not valid ((or not registered in the execution agent management table 800), the agent is excluded (step 142), thereby completing the process.

In the case where the agent reporting the change in status information is a valid agent (step 141), the status change coping means 140 judges the content of the status change to determine means for coping with the status change (step 143). The status change coping means 140 has, as means for coping with the status change, four ways which include alarm, cancellation, re-reservation, and presentation of alternative means and reservation. Which means is to be performed, is registered by the user beforehand, determined depending on the category of an object of reservation, determined from the present self-position, map information and so forth, or selected by the user on that occasion in step 143. Alternatively, it may be designated by the user beforehand.

In the case where the coping means is registered by the user beforehand, coping means 480 may be added into the reservation management data structure 400 so that it is registered therein. In the case where the coping means determined depending on the category of an object of reservation, the category of an object of reservation and coping means may be associated with each other beforehand so that when the reservation management data structure 400 is generated, that coping means is registered into the coping means 480 in the reservation management data structure 400.

In the case where the coping means is determined from the present self-position, map information and so forth, several paths other than a path acquired in step 109 shown in FIG. 12 are extracted from the map information or the like and the shortest movement time is determined by performing processings similar to those in steps 701 and 702 shown in FIG. 21. The decision is made on the basis of the result of determination of the shortest movement time.

Subsequently, the status change coping means 140 discriminates the coping means determined in step 143 (step 144). In the case where the coping means is alarm, the status change coping means 140 informs the user that the execution of the reserved matter is difficult (step 145), thereby completing the process.

In the case where the coping means is cancellation, the status change coping means 140 makes access to the reservation center corresponding to an object of reservation to cancel the reservation (step 146). The procedure for cancellation of the reservation is similar to the process by the reserving means 100. Also, a reservation management data structure 400 of the cancelled reservation is annulled.

At this time, if the reservation management data structure 400 to be annulled is included in a certain reservation chain as shown in FIG. 27, the data structure 400 is also deleted from that reservation chain. Further, if a reservation ID possessed by the reservation management data structure to be annulled exists in the status information coping table 600 shown in FIG. 9, a data set for this reservation ID is deleted from the status information coping table 600.

In the case where the coping means is re-reservation, the shortest movement time is determined by performing processings similar to those in steps 701 and 702 shown in FIG. 21 (step 147) and makes access to a reservation center corresponding to an object of reservation is made to make a re-reservation (step 148). At this time, the previous reservation is cancelled and a reservation management data structure 400 of the cancelled reservation is annulled. A procedure for making the re-reservation is similar to the process by the reserving means 100. In the reserving means 100, a reservation management data structure 400 of the new reservation is generated and is registered into the reservation management table 500.

In the case where the coping means is presentation of alternative means and reservation, the status change coping means 140 presents that alternative means to the user (step 149) and makes a reservation for means selected by the user (step 150). At this time, the previous reservation is cancelled and a reservation management data structure 400 of the cancelled reservation is annulled. A procedure for making the reservation is similar to the process by the reserving means 100. In the reserving means 100, a reservation management data structure 400 of the new reservation is generated and is registered into the reservation management table 500.

Subsequently, the status change coping means 140 judges whether or not the change made for the reservation under consideration causes the need of a change for another reservation in a reservation chain (step 151). If the need of a change is caused, the flow returns to step 143 to repeat the process for a reservation which has the need of a change.

In the case where the need of a change is not caused, the status change coping means 140, finally and if necessary, informs another user in appointment of the change of reservation, thereby completing the process. At this time, for example, an estimated instant of time of arrival at a destination, a message to the effect that it is to be late for appointment or a message to the effect that the promise or reservation is to be cancelled, is displayed on a portable information terminal of the other user (step 152).

With the foregoing, an agent can detect a temporal change of status information indicating that the execution of a matter reserved by a user is difficult. In attendance thereupon, a portable information terminal can present what is to be next done by the user or automatically make the vicarious execution of what is to be done.

In step 149, not only alternative means of a reservation under present consideration but also alternative means of other reservations in a corresponding reservation chain succeeding to the reservation under consideration in attendance upon a change of the reservation under consideration may be presented at the same time. In other words, instead of presenting alternative means individually to reservations having a need of change, alternative means of each of plural reservations included in the reservation chain are presented in combination at once. In this case, since alternative means to be presented includes the combination of plural alternative means of each reservation, the number of selectable alternative means becomes large as compared with that in the above-mentioned method. However, since the designation of alternative means can be made at once, the operation becomes simpler.

Figure 26:
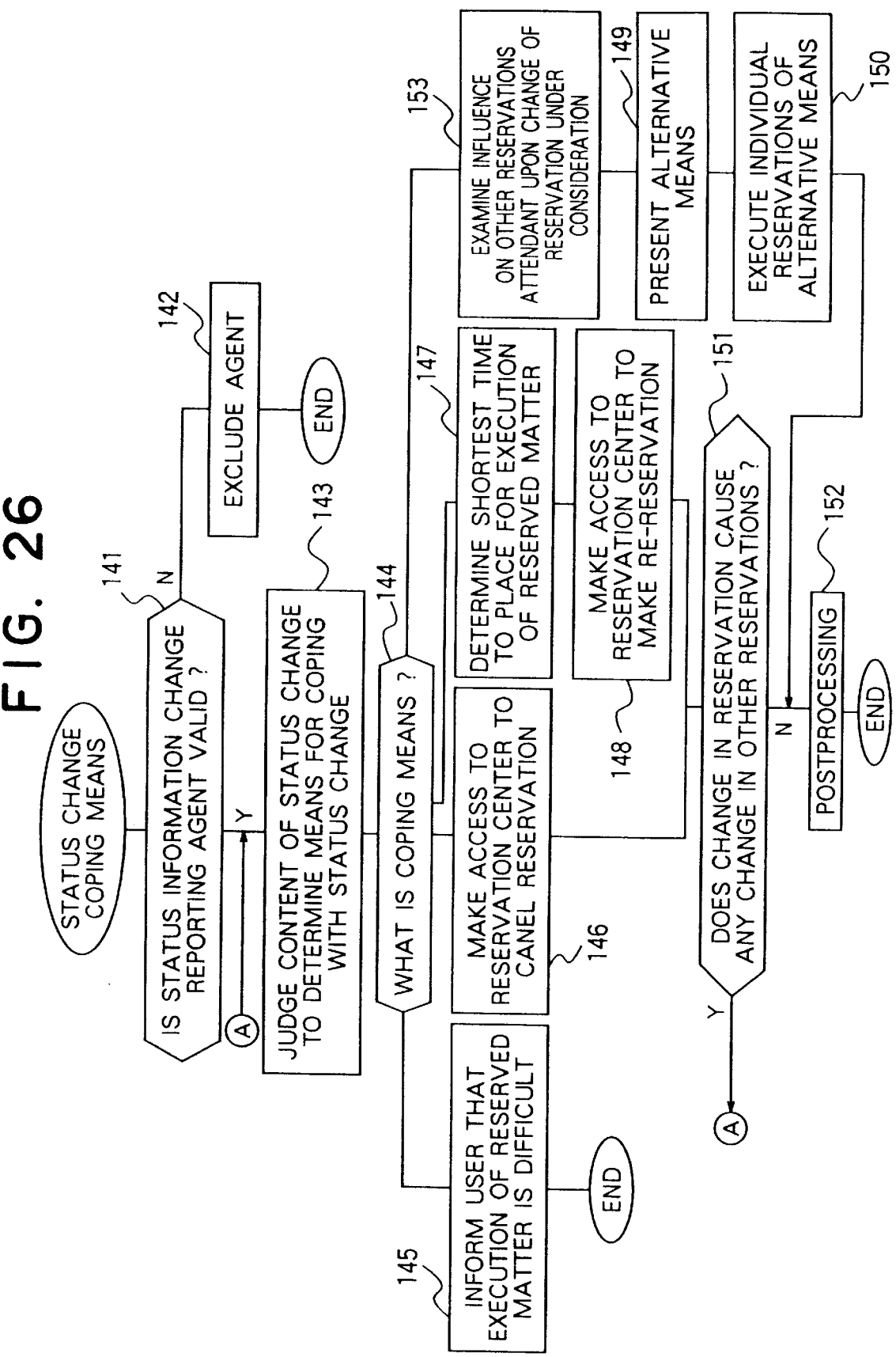
FIG. 26 is a flow chart showing another process example of the status change coping managing means in the present embodiment.

The process flow chart of the status change coping means 140 in this case may be changed as shown in FIG. 26. Referring to FIG. 26, in the case where the coping means in step 144 is the presentation of alternative means and a reservation, alternative means of a reservation directly influenced by a change in status is generated to examine the influence of this change of reservation on other reservations in a reservation chain (step 153). In the case where there are the influence on the other reservations, alternative means capable of being taken by all influenced reservations are combined to present all the combined alternative means to a user (step 154). Individual reservations in the combined alternative means selected by the user are executed (step 155). If necessary, another user in appointment is informed of the change of reservation (step 152), thereby completing the process.

Figure 23:
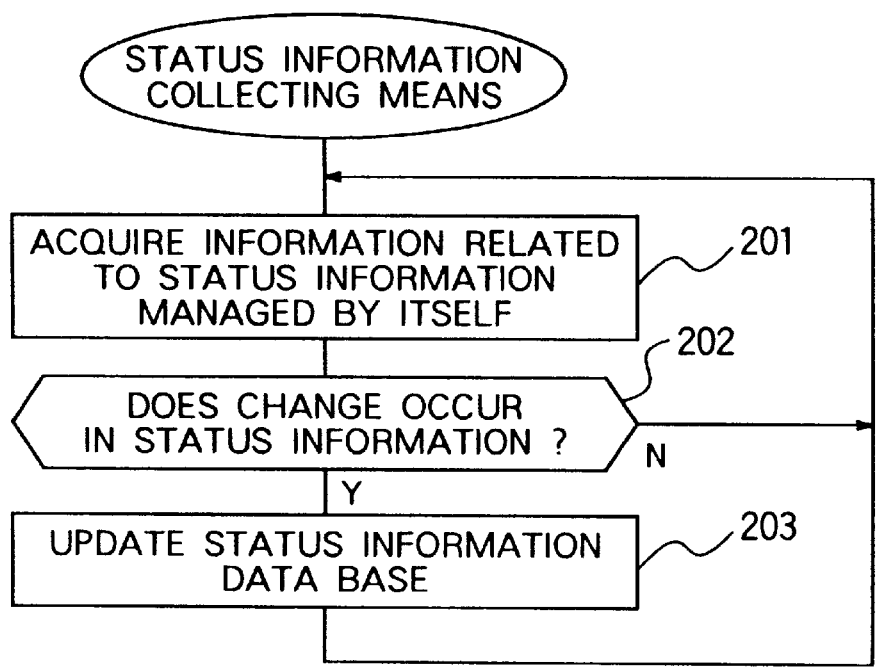
FIG. 23 is a process flow chart of status information collecting means in the present embodiment.

FIG. 23 is a process flow chart of the status information collecting means 200. A program for realizing this process is stored in the main storage 42 or the auxiliary storage 43 in a status information IP and is executed by the CPU 41.

As shown in FIG. 23, the status information collecting means 200 acquires information related to status information managed by itself (step 201). The information is acquired from another IP and so forth. On the basis of the acquired information, the status information collecting means 200 judges whether or not a change occurs in the status information managed by itself (step 202). If the change occurs, the status information collecting means 200 updates the status information data base (step 203) and repeats a processing from step 201 to step 203.

Figure 24:
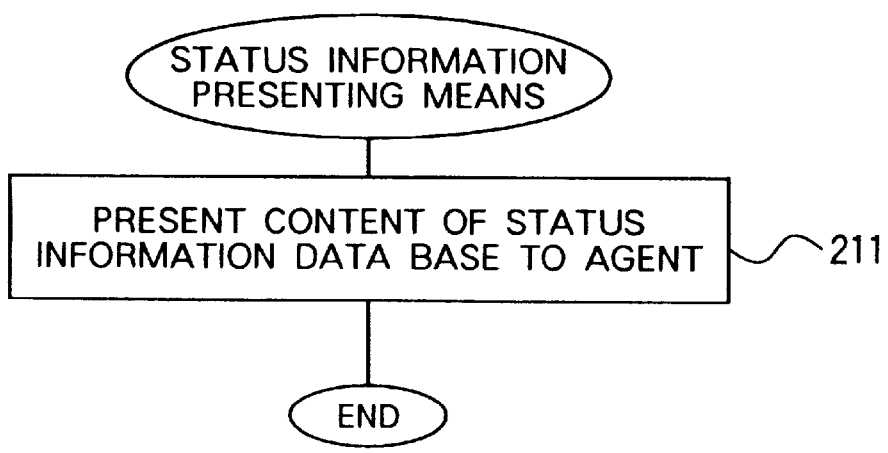
FIG. 24 is a process flow chart of status information presenting means in the present embodiment.

FIG. 24 is a process flow chart of the status information presenting means 210. A program for realizing this process is stored in the main storage 42 or the auxiliary storage 43 in a status information IP and is executed by the CPU 41 in the juncture of a status information presenting request from an agent which operates in the status information IP.

As shown in FIG. 24, the status information presenting means 210 presents the content of the status information data base 230 to the requesting agent (step 311), thereby completing the process.

INDUSTRIAL APPLICABILITY

According to the present invention, the monitoring of a temporal change of information of a status causing the difficulty of the execution of a matter reserved by a user in advance enables the prompt perception of that status and the support or vicarious execution of an action to be next taken by the user.

Also, the present invention is widely applicable to, for example, a system in which the prompt perception of an unexpected situation is made through the continual monitoring of a change of information of various statuses surrounding a user with a portable information terminal carried with him or her, thereby supporting a counter action to be taken by the user or the formulation of a new plan.

What is claimed is:

1. A portable information terminal comprising radio communication means for communicating with a plurality of reservation centers and a plurality of status information providing means, via a communication network connected to, said portable information terminal comprising:

reserving means for accessing to a reservation center, and reservation storing means for storing a reservation content of a reservation;

status information collecting and judging means for collecting status information relating to execution of said reservation content from said status information providing means through said communication network, and comparing collected information with said reservation content to judge whether said reservation content is to be changed;

alternative reservation generating means for collecting, when said status information collecting and judging means judges that said reservation content is to be changed, information relating to an alternative reservation to show the alternative reservation; and reservation change executing means for canceling the current reservation and storing said alternative reservation into said reservation storing means.

2. A portable information terminal according to claim 1, wherein said reserving means is further provided to display information representative of objects of reservation, to access said reservation center corresponding to an object of reservation selected by a user, and to hold the reserved matter into storing means.

3. A portable information terminal according to claim 2, further comprising status information monitoring means provided to extract necessary information, and to determine, in accordance with extracted information, whether execution of the reserved matter held in said storing means is possible.

4. A portable information terminal according to claim 3, wherein said status information monitoring means is further provided to receive information from another portable information terminal through said radio communication device, and to determine on the basis of the received information whether the execution of the reserved matter held in said storing means is possible.

5. A portable information terminal according to claim 3, further comprising a self-position measuring device, and status change coping means provided to determine a shortest time to place for execution of the reserved matter held in said storing means on the basis of positional information acquired by said self-position measuring device, and to determine whether the execution of the reserved matter held in said storing means is possible.

6. A portable information terminal according to claim 3, further comprising status change coping means provided to inform the user that the execution of the reserved matter held in said storing means is possible.

7. A portable information terminal according to claim 3, further comprising status change coping means provided to access to said reservation center to cancel the reservation held in said storing means.

8. A portable information terminal according to claim 3, further comprising status change coping means provided to determine a shortest time to place for execution of the reserved matter held in said storing means, to make a re-reservation in compliance with an estimated instant of time of arrival to place for execution of the reserved matter held in said storing means, and to hold the re-reserved matter into the storing means.

9. A portable information terminal according to claim 3, further comprising status change coping means provided to present alternative means to the user to make a reservation selected by the user, and to cancel the reservation held in said storing means and hold the reserved matter into the storing means.

10. A portable information terminal according to claim 3, further comprising status change coping means provided to change, when the reservation held in said storing means is changed, that reservation held in said storing means which has a relationship with the change.

11. A portable information terminal comprising a self-positioning measuring device and radio communication means for communicating with a plurality of reservation centers and a plurality of status information providing means via a communication network, said portable information terminal comprising:

reserving means for accessing to a reservation center, and reservation storing means for storing a reservation content of a reservation;

status information collecting and judging means for collecting status information relating to execution of said reservation content from said status information providing means via said communications network and deciding, based on collected information and position information obtained by said self-positioning device, whether to move to a location for execution of said reservation content, deciding whether said reservation content is to be changed;

alternative reservation generating means for collecting, in the case where said status information collecting and judging means judges that said reservation content is to be changed, information relating to an alternative reservation to show the alternative reservation; and reservation change execution means for canceling the current reservation and storing said alternative reservation into said reservation storing means.

12. A communication system, comprising:

one or more reservation centers connected to a communication network, for enabling users to make reservations of available services;

one or more status information providers connected to said communication network, for enabling the users to obtain status information of available services;

one or more base stations connected to said communication network, for enabling one or more mobile terminals carried by the users to communicate with respective reservation centers and status information providers to make reservations and obtain status information of available services respectively, wherein each mobile terminal comprises:
- a storage device which stores an agent program for enabling a user to make a reservation, to execute and update said reservation, and to obtain status information of available services, via said communication network;
- a radio transceiver which establishes radio communications with one of said designated reservation center, said designated status information network and another mobile terminal, via a corresponding base station;
- a global positioning system (GPS) receiver which determines a location of said mobile terminal relative to said corresponding base station;
- an input device which provides different control functions designated by the user to make said reservation, to execute and update said reservation, and to obtain status information of available services; and
- a display device which provides a visual display of icons indicating objects of reservations and status information of available services.

13. A communication system according to claim 12, wherein said designated reservation center comprises:
- a storage device which stores a reservation program for enabling the user to make a reservation, to execute and update said reservation from said mobile terminal, via said communication network;
- a communication controller connected to said communication network, which establishes communications with said mobile terminal, via said corresponding base station; and
- a display device which provides a visual display of icons indicating objects of reservations of available services.

14. A communication system according to claim 12, wherein said designated status information provider comprises:
- a storage device which stores a status information program for enabling the user to obtain status information from said mobile terminal, via said communication network;
- a communication controller connected to said communication network, which establishes communications with said mobile terminal, via said corresponding base station; and
- a display device which provides a visual display of icons indicating objects of status information of available services.

15. A communication system according to claim 12, wherein said reservations of available services include, but are not limited to, railway, flight, bus, hotel and restaurant restaurant reservations, and said status information includes, but is not limited to, traffic jam information and weather-related information.

* * * * *